United States Patent
Ferlay et al.

(10) Patent No.: US 9,145,955 B2
(45) Date of Patent: Sep. 29, 2015

(54) REDUCING DEVICE HAVING A HIGH REDUCTION RATIO, ROBOT AND HAPTIC INTERFACE COMPRISING AT LEAST ONE SUCH REDUCING DEVICE

(75) Inventors: Fabien Ferlay, Taulignan (FR); Florian Gosselin, Vanves (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 405 days.

(21) Appl. No.: 13/704,808

(22) PCT Filed: Jun. 15, 2011

(86) PCT No.: PCT/EP2011/059952
§ 371 (c)(1),
(2), (4) Date: Dec. 17, 2012

(87) PCT Pub. No.: WO2011/157757
PCT Pub. Date: Dec. 22, 2011

(65) Prior Publication Data
US 2013/0090194 A1    Apr. 11, 2013

(30) Foreign Application Priority Data
Jun. 17, 2010    (FR) .................................... 10 54823

(51) Int. Cl.
*F16H 9/04*    (2006.01)
*B25J 9/10*    (2006.01)
(Continued)

(52) U.S. Cl.
CPC . *F16H 9/04* (2013.01); *B25J 9/104* (2013.01); *B25J 13/02* (2013.01); *F16H 19/005* (2013.01); *F16H 19/06* (2013.01); *F16H 2019/0695* (2013.01); *Y10T 74/18848* (2015.01)

(58) Field of Classification Search
CPC . F16H 2019/0695; F16H 19/005; F16H 9/04; B25J 13/02; B25J 9/104
See application file for complete search history.

(56) References Cited

U.S. PATENT DOCUMENTS 2,859,629 A    11/1958    Parker et al.
5,207,114 A  *  5/1993    Salisbury et al. .......... 74/479.01
(Continued)

FOREIGN PATENT DOCUMENTS

EP              1 629 949          3/2006
WO     WO 2007/093564 A1    8/2007

OTHER PUBLICATIONS

International Search Report Issued Aug. 2, 2011 in PCT/EP11/59952 Filed Jun. 15, 2011.
(Continued)

*Primary Examiner* — David M Fenstermacher
(74) *Attorney, Agent, or Firm* — Oblon, McClelland, Maier & Neustadt, L.L.P.

(57) ABSTRACT

A reducing device having a cable or a belt and cable, providing a high reduction ratio, and including: two driving drums; two sheave wheels; at least one driving cable traveling from a first driving drum to one sheave wheel, from the one sheave wheel to the second driving drum, from the second driving drum to the other sheave wheel, and from the other sheave wheel to the first driving drum; a driven cable, including one strand which travels from a fork of the one sheave wheel to a driven wheel, and one strand which travels from the driven wheel to a fork of the other sheave wheel. The driving drums have different diameters and/or different rotation speeds so rotation thereof causes movement of the sheave wheels driving the driven cable, and rotation movement of the driven wheel. The reducing device is applicable, for example, to robots and haptic interfaces.

33 Claims, 19 Drawing Sheets

(51) Int. Cl.
*B25J 13/02* (2006.01)
*F16H 19/06* (2006.01)
*F16H 19/00* (2006.01)

(56) References Cited

U.S. PATENT DOCUMENTS

| | | | |
|---|---|---|---|
| 6,622,580 B1 | 9/2003 | Chang et al. | |
| 7,086,307 B2 * | 8/2006 | Gosselin et al. | 74/490.06 |
| 8,540,748 B2 * | 9/2013 | Murphy et al. | 606/205 |
| 8,709,000 B2 * | 4/2014 | Madhani et al. | 606/1 |
| 8,770,905 B2 * | 7/2014 | Al-Mouhamed et al. | 414/5 |
| 8,950,286 B2 * | 2/2015 | Gosselin et al. | 74/490.06 |
| 2006/0163006 A1 | 7/2006 | Strebel et al. | |
| 2012/0234126 A1 | 9/2012 | Gosselin et al. | |

OTHER PUBLICATIONS

Preliminary Search Report issued Feb. 11, 2011 in French Patent Application No. FR 1054823 (FA 738411) (with English Translation of Category of Cited Documents).

* cited by examiner

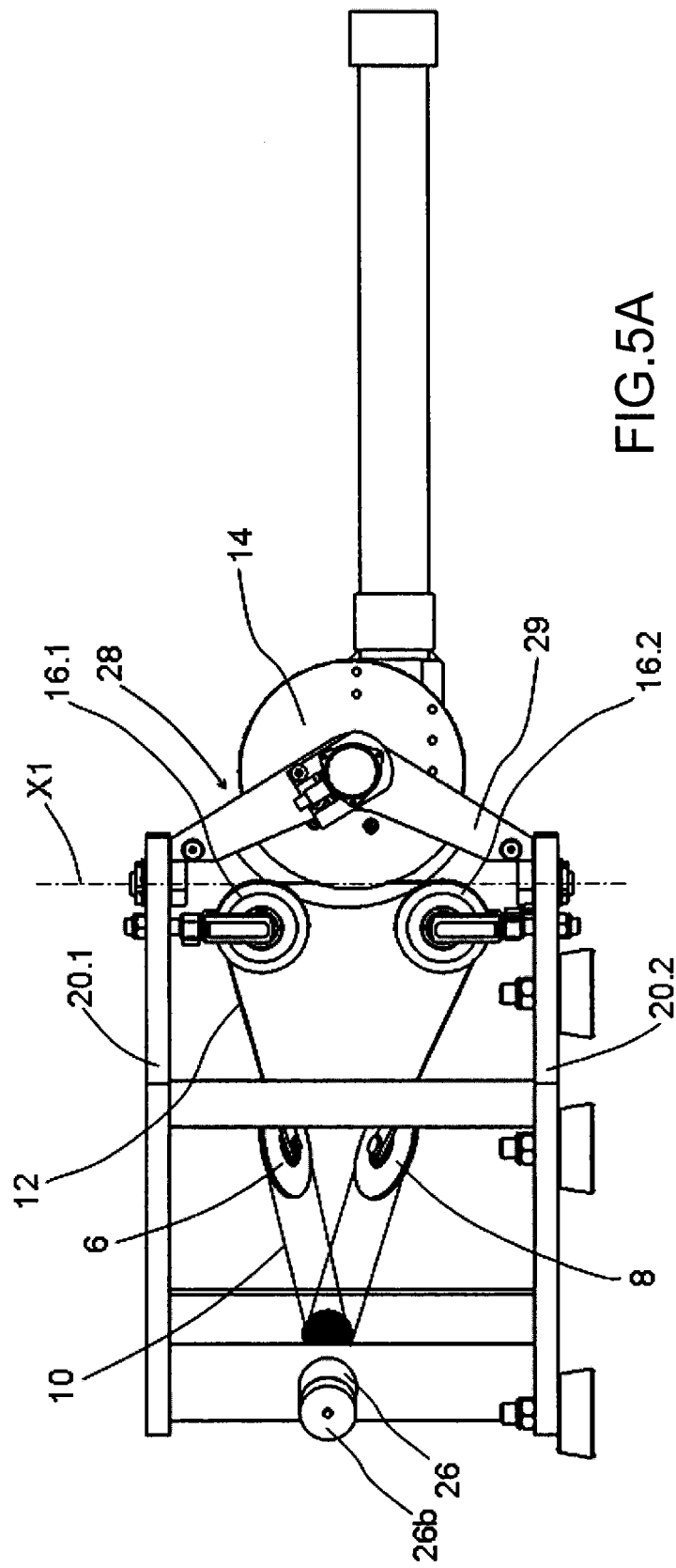

REDUCING DEVICE HAVING A HIGH REDUCTION RATIO, ROBOT AND HAPTIC INTERFACE COMPRISING AT LEAST ONE SUCH REDUCING DEVICE

TECHNICAL FIELD AND PRIOR ART

The present invention relates to a reducing device having a high reduction ratio, and to a device comprising at least one such reducing device, such as a robot or a haptic interface.

Robots and haptic interfaces are constituted of multi-hinged mechanical chains actuated in general by electric motors. Usually, reducing devices are provided between the actuating devices and the actuated elements to amplify the forces. The performances are directly linked to the quality of the devices for actuating, amplifying and transmitting forces.

Generally speaking, mechanical transmissions and reducing devices pose two problems: the loss of energy and the operating play. For reducing devices, the greater the reduction ratio the more these phenomena are marked. Thus, the greater the reduction ratio, the lower the efficiency and/or greater the play. These phenomena are all the more marked since, in numerous cases, a superposition of reducing devices is used.

In the field of industrial robots, there exists reducing devices, such as "Harmonic Drive" reducing device, worm gear, etc., which offer large reduction ratios without play and with acceptable efficiency.

However, in the field of haptic interfaces, it is also sought to have a reversible system with low friction and small play, whether the reducing device is tackled in input or in output. However, most existing reducing devices are not reversible. For example, "Harmonic Drive" reducing devices have considerable friction for a high reduction ratio.

Specific reducing devices have consequently been developed for haptic interfaces, for example the capstan winch with cable. This is composed of a driving wheel and a driven wheel, a cable connecting the two wheels. This type of reducing device makes it possible to attain high reduction ratios, however in this case its size is important.

In fact, the reduction ratio is directly given by the ratio between the diameter of the driven wheel and that of the driving wheel calculated at the level of the neutral axis of the cable. However, the diameter of the driving wheel is limited by the winding capacities of the cable, this can typically not be less than 10 mm for the most common cables. To obtain a high reduction ratio, it is thus necessary to increase the diameter of the driven wheel, thus bringing about an increase in the size.

This is not a solution that may be envisaged if it is wished to conserve a compact system, which is particularly desired in the case of robots and haptic interfaces.

Other reducing devices are used on certain interfaces:
  gear reducing devices, however these have either play, or friction,
  pulley block reducing devices, however their reduction ratio is limited. They are in addition complex and relatively bulky embodiments,
  belt reducing devices only offer in general quite a low reduction ratio,
  ball screw reducing devices are complex embodiments.

It is consequently an aim of the present invention to offer a reversible reducing device capable of having a high reduction ratio and of simple embodiment.

DESCRIPTION OF THE INVENTION

In this document, the term sheave wheel will designate a pulley advantageously with a groove in rotation in a moveable yolk. The term drum will designate a pulley of large width onto which a cable is wound, and advantageously guided during its winding and its unwinding by a spiral imprint on said pulley, or a pulley of smaller width on which a belt is wound, and advantageously guided during its winding and its unwinding by a negative imprint of the belt on said pulley. Furthermore, the term wheel could be used to designate a pulley.

The previously stated aim is attained by a reducing device with cable or with belt and cable comprising two driving drums of different diameters and/or having different rotation speeds, two sheave wheels, at least one first cable, the ends of which are fixed either on the same drum or each on one of the drums or a belt travelling on the two drums, one of the strands of the first cable(s) or of the belt being wound around two driving drums and travelling around a first sheave wheel and another strand of the first cable(s) or of the belt being wound around two driving drums and travelling around the other sheave wheel, the sheave wheels being supported by yolks moveable mainly in translation, a second cable being attached to the yolks of the sheave wheels and wound around the driven wheel. On account of either the different diameters of the driving drums and/or their different rotation speeds, the yolks each move in a mainly linear manner, causing a movement of the cable travelling around the driven wheel and thus a rotation of the driven wheel.

Thanks to such a reducing device, it is possible to attain a high reduction ratio. Moreover, it is reversible, has reduced friction and is of simple embodiment.

In other words, the reducing device according to the present invention comprises two differential systems having a cable or belt in opposition connected by a secondary cable driving a driven pulley. Each differential system having a cable or belt comprises a sheave wheel supported by a yolk moved mainly in translation, said sheave wheel turning as a function of the movements of a cable or a primary belt, the free length of which varies. To vary the free length of said cable, respectively of said belt, the cable, respectively the belt, is wound on two synchronised drums: the first unwinds from the cable, respectively the belt, while the second winds onto it. It is then possible to impose different winding and unwinding lengths so that the total length of the free portion of the cable, respectively of the belt, varies and that the sheave wheel is placed in movement by using two different drum diameters and/or making the drums turn at different speeds.

The reducing device according to the invention may be reversible, since the input and the output of the reducing device may be reversed.

Advantageously, this makes it possible to reduce the masses in movement, since the cables and belts have a low inertia. In addition, friction is low and the efficiency of the system is high.

Moreover, the system is only composed of simple parts. Furthermore, the system is relatively compact.

In an advantageous example, the two driving drums are coaxial and rotationally integral and have different winding diameters.

In this case, a single primary cable may be used to travel between the driving drums and the sheave wheels, which reduces the number of anchoring points and makes it possible to reduce the length of the set of two drums.

In a variant of this embodiment, the two drums are separated and their rotation is synchroised. The synchronisation ratio may be fixed or variable and controlled, which makes it possible to adjust the reduction ratio.

In another embodiment example, the two drums have separate and advantageously parallel axes, their rotation is then also synchronised. Such an embodiment enables the reducing device to be made even more compact.

The subject matter of the present invention is consequently a reducing device with cable or with cable and belt comprising two driving drums, two sheave wheels each mounted in a yolk, at least one driving cable or a belt travelling from a first driving drum to a sheave wheel, from said sheave wheel to the second driving drum, from said second driving drum to the other sheave wheel and from said other sheave wheel to the first driving drum, a driven cable, one strand of which travels from the yolk of one of the sheave wheels to a driven wheel and one strand travels from the driven wheel to the yolk of the other sheave wheel, the driving drums having different diameters and/or different rotation speeds so that the rotation of the driving drums causes a reduction, respectively an increase, in the distance between one of the sheave wheels and the driving drums simultaneously with an increase, respectively a reduction, in the distance between the other of the sheave wheels and the driving drums, driving the driven cable and a rotation movement of the driven wheel.

Advantageously, if a driving cable is used, the driving drums comprise a thread to guide the driving cable.

In one embodiment example, the driving drums are rotationally integral and have the same axis of rotation, said drums having different diameters. The threads of the driving drums may then turn in the same direction.

The driving cable may for example be fixed by a first end to a longitudinal end of the first driving drum, be wound around the central part of the second driving drum and be fixed by a second end to the other longitudinal end of the first driving drum.

In another embodiment example, the driving drums have separate rotation axes, and the reducing device comprises two strands of driving cables, one strand of driving cable travelling between the first driving drum, the first sheave wheel and the second driving drum and one strand of driving cable travelling between the first driving drum, the second sheave wheel and the second driving drum. The driving drums may then have parallel axes of rotation.

Advantageously, if a belt is used, the driving drums comprise a negative imprint of the belt guiding the belt.

Said type of reducing device may also be used to actuate an axis situated beyond a first axis of rotation. In this case, advantageously, the driven cable is guided by return pulleys so as to pass along or near to said first axis of rotation around which a yolk supporting the driven wheel can turn.

The subject matter of the present invention is also a rotation actuating system comprising at least one electric motor, and at least one reducing device according to the present invention, said electric motor being coupled to said driving drums.

In one embodiment example, the motor is in direct drive with the first and second driving drums.

In another embodiment example, the motor is in direct drive or via transmission means with one of the driving drums and transmission means are provided between the first and second driving drums or between the motor and the second driving drum. The system may then comprise a differential between the motor and the driving drums. A controller making it possible to vary and control at any instant the synchronisation ratio between the driving drums may then be advantageously provided, if the transmission means of the motor to at least one of the driving drums are of variable reduction ratio.

According to an additional characteristic of the invention, the motor is provided with an angular position sensor.

The subject matter of the present invention is also a hinged mechanism for robot or haptic interface comprising at least one first actuating system according to the present invention.

The driven pulley is, for example, mounted moveable in rotation around its axis in a yolk, said yolk being moveable in rotation around another axis not parallel to the axis of rotation of the driven wheel.

The hinged mechanism according to the present invention may comprise an arm fixed on the driven wheel rotationally integral with the driven wheel and a forearm hinged on the arm around a third axis parallel to the axis of rotation of the driven wheel.

The mechanism according to the invention may comprise a second actuating system according to the present invention to drive in rotation the arm, the first actuating system driving the forearm around the third axis of rotation.

The driven wheel of the second drive system may then be situated near to the driven wheel of the first drive system and coaxial to it, a connecting rod being provided between the driven wheel of the first actuating system and the forearm.

The present invention also relates to a robot or a haptic interface comprising at least one hinged mechanism according to the present invention and motor command means.

The robot or the haptic interface according to the present invention may advantageously comprise two mechanisms in parallel and an actuating motor mounted in series with said two mechanisms.

The subject matter of the present invention is also a robot comprising at least one hinged mechanism according to the present invention on which, by means of the controller of the robot, the reduction ratio is modified by reducing it at given moments for example to be able to move the effector at high speed, for example during approach phases, and increasing it at given moments in order to be able for example to apply important forces with the effector, for example during working phases.

The subject matter of the present invention is also a haptic interface or master arm comprising at least one hinged mechanism according to the present invention, on which, by means of the controller of the robot, the reduction ratio is modified by reducing it at given moments in order to be able for example to increase the transparency of the system, for example during movements in free space in the virtual or distant environment, and by increasing it at given moments for example in order to be able to increase the capacity of the system to apply forces in reaction to the actions of the user and to interactions in the virtual or distant world, for example during contact tasks.

The subject matter of the present invention is also a collaborative robot comprising at least one hinged mechanism according to the present invention, by means of the controller of the robot the reduction ratio is modified by reducing it at given moments to be able for example to increase the transparency of the system, for example during movements in free space, and by increasing it at given moments for example to be able to apply important forces with the effector, for example during user assistance phases.

BRIEF DESCRIPTION OF DRAWINGS

The present invention will be better understood on reading the description that follows and by referring to the appended drawings in which.

DETAILED DESCRIPTION OF PARTICULAR EMBODIMENTS

Figure 1A:
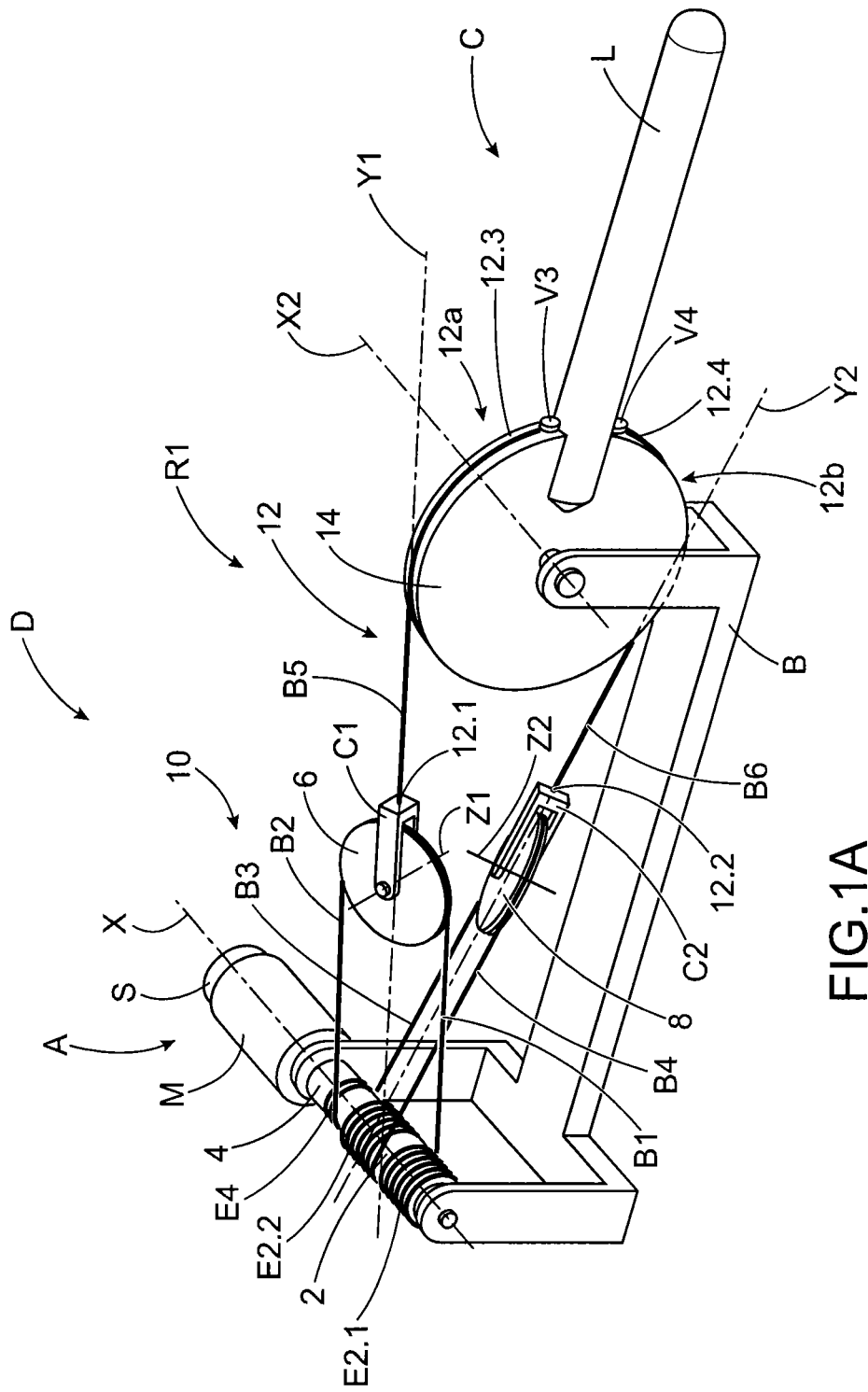
FIG. 1A is a perspective view of a device incorporating an embodiment example of a reducing device according to the present invention.
Figure 1B:
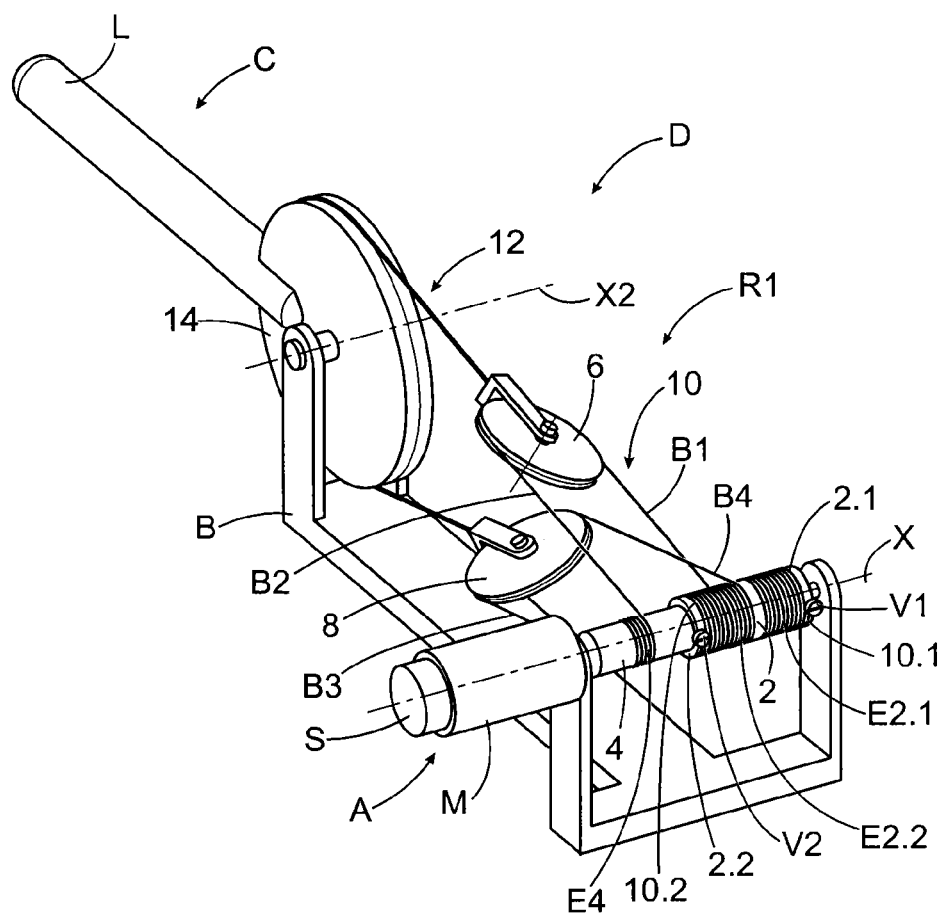
FIG. 1B is a second perspective view of the device of FIG. 1A, FIGS. 2A and 2B are perspective views of the device of FIGS. 1A and 1B in different positions.

In FIGS. 1A and 1B may be seen a perspective view of a device D comprising an embodiment example of a differential reducing device R1 particularly suitable for robots and haptic interfaces.

The reducing device R1 comprises a first 2 and a second 4 driving drum rotationally integral around an axis X and of different diameters and capable of turning around the axis X with respect to a base part B. For reasons of simplicity, the driving drums will be designated simply as "drums".

In the example represented, the first drum 2 has a diameter D1 greater than the diameter D2 of the second drum 4. The reducing device R1 also comprises a first 6 and a second sheave wheel 8, and a cable 10 travelling from the first drum to the first sheave wheel, to the second drum, to the second sheave wheel 8 and to the first drum 2.

In the example represented, a single cable 10 travels between the drums and the sheave wheels, which makes it possible to form only two couplings on the first drum 2 and to reduce the length of the second drum 4, but it is understood that separate cables could be used to connect each sheave wheel 6, 8 to the two drums 2, 4.

In the example represented, the cable 10 is coupled by a first end 10.1 to a longitudinal end 2.1 of the first drum and by a second end 10.2 to a second longitudinal end 2.2 of the first drum. In the example represented, these fixations are achieved by pinching of the cable 10 by the screws V1 and V2. Any other device for fixing the ends of the cable could obviously also be used. It could be, for example and in a non-exhaustive manner, crimpings or knots placed at the ends of the cable and blocked in housings of the drum 2 or instead V-shaped grooves in which the ends of the cable jam.

Advantageously, the driving drums 2, 4 comprise a thread to guide the cable 10, which improves the reliability of the reducing device by avoiding several turns crossing or superimposing. In FIGS. 1A, 1B, 2A, 2B, 3A, 3B, 4, 7, 8, 9A to 9F and 10, said thread is not represented in order to make the figures easier to read. It is represented in FIGS. 5A to 5D. Furthermore, FIGS. 1A, 2A, 2B, 9A to 9F and 10 show a winding pitch of the strand(s) of cable 10, 110, 110' on the drums 2, 102 and 4, 104, which is important in order to improve the legibility of the figures. The winding pitch of the cables on the drums will be advantageously selected as low as possible, as is shown in FIGS. 1B and 3B, such that the length of the drums is minimised, two successive turns of cable then being very close, quasi-jointed or jointed.

The reducing device R1 also comprises a second cable 12. In the example represented, the cable 12 comprises two separate strands 12a and 12b but a single cable could be used provided that the ends 12.3 and 12.4 are connected together.

The device D is provided with an actuating device A and a body C moveable in rotation around the axis X2 with respect to the base B. The device A comprises a motor M, the stator of which could be advantageously fixed on the base B and the rotor made integral with the drums 2 and 4. The body C comprises in particular a segment L and a driven pulley 14 to which the cable 12 or the strands of cable 12a and 12b are attached. The presence of the segment L is not obligatory and the pulley 14 may be used directly at the output of the mechanism without going beyond the scope of the invention.

The strands 12a and 12b of the cable 12 are connected at their other ends 12.1 and 12.2 to yokes C1 and C2 supporting the sheave wheels 6 and 8. The linear movement of the yokes causes the movement of the cable 12 which drives in rotation the driven wheel 14.

The assembly constituted of the cable 10, sheave wheels 6, 8, yokes C1, C2 and the cable 12 thereby transmits the movement of the driving drums 2, 4 to the driven pulley 14.

The motor M may be used to drive the segment L via the reducing device R1 on a robot or a haptic interface or further to resist via the reducing device R1 the movements of the user when said user moves the segment L. Said resistance could advantageously be a function of the interactions in a virtual environment that it controls if the device is a haptic interface or the interactions of a robot that it controls with the distant environment if the device is a master arm for remote operation or with the close environment if the device is a collaborative robot. The motor M is advantageously equipped with a position sensor S making it possible to measure its movements and enslave its movements or its motor or resistant forces to the command signals coming from the simulation or the controller thereof.

It is understood that the motor M may be of any suitable type, such as for example a direct current electric motor, an auto-controlled synchronous motor, a synchronous motor, a piezo-electric motor or instead a pneumatic, hydraulic or shape memory alloy (SMA) based actuator. Instead of the motor M and in order to oppose a resistance to the movements of the user, a braking system may further be used, such as for example a powder brake, an electro or magneto rheological fluid brake or a disk, drum or block brake. These two types of solutions may further be combined, the motor M then being replaced by an assembly composed of a motor and a brake. This type of association is known to those skilled in the art and will not be detailed herein. It is also understood that the device S for measuring the movements of the motor M may be of any suitable type, such as for example an optical coder, a potentiometer, a Hall effect sensor or a magneto-optic sensor.

The device D could obviously be equipped with several position sensors. The rotation of the pulley 14 with respect to the base B could for example be measured by a second position sensor, as could the rotation of the sheave wheels 6 and 8 or the position of the yolks C1 and C2.

The device D could also be provided with one or more force sensors to enslave more finely the forces of the motor M as a function of the command signals. Said sensor(s) could for example and in a non-exhaustive manner be arranged between the motor M and the drums 2, 4, at the level of the axis of the sheave wheels 6 and 8, at the level of the coupling of the cable 12 on the yolks C1 and C2 or instead between the base B and the pulley 14 at the level of the axis X2.

The cable 10 comprises a first portion E2.1 at its first end 10.1 wound around the first drum 2, a strand B1 extending between the first drum 2 and the first sheave wheel 6, a second strand B2 extending between the first sheave wheel and the second drum 4, a median portion E4 wound around the second drum 4, a third strand B3 extending between the second drum 4 and the second sheave wheel 8, a fourth strand B4 extending between the second sheave wheel 8 and the first drum 2 and a third portion E2.2 at the level of its second end 10.2 wound around the first drum 2.

As may be seen, in the embodiment example represented, the threads on the drums 2 and 4 have the same direction of winding and the cable 10 travels between the drums 2, 4 and the sheave wheels 6, 8 such that the first and second strands B1, B2 are arranged in staggered pattern with respect to the third and fourth strands B3, B4.

Said reducing device R1 has the advantage of avoiding any collision or crossing of the cable strands.

Any other configuration of the threads, in particular with different winding directions on the drums 2 and 4, is also possible and does not go beyond the scope of the invention. In this case, the strands of cable B1 to B4 will not necessarily be arranged in the same order as in FIGS. 1A and 1B.

The operation of the reducing device R1 according to the present invention will now be explained.

Figure 2A:
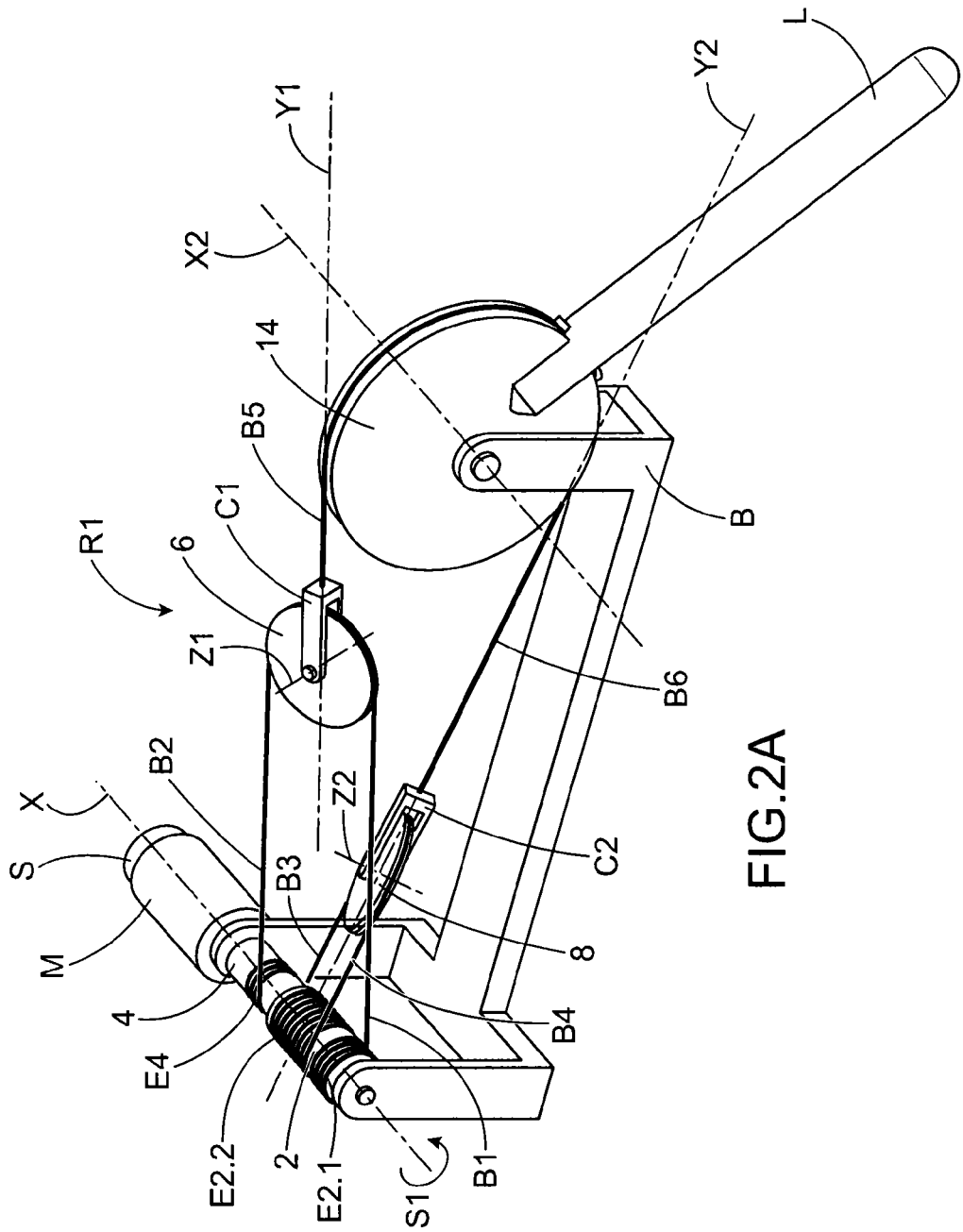
Figure 2B:
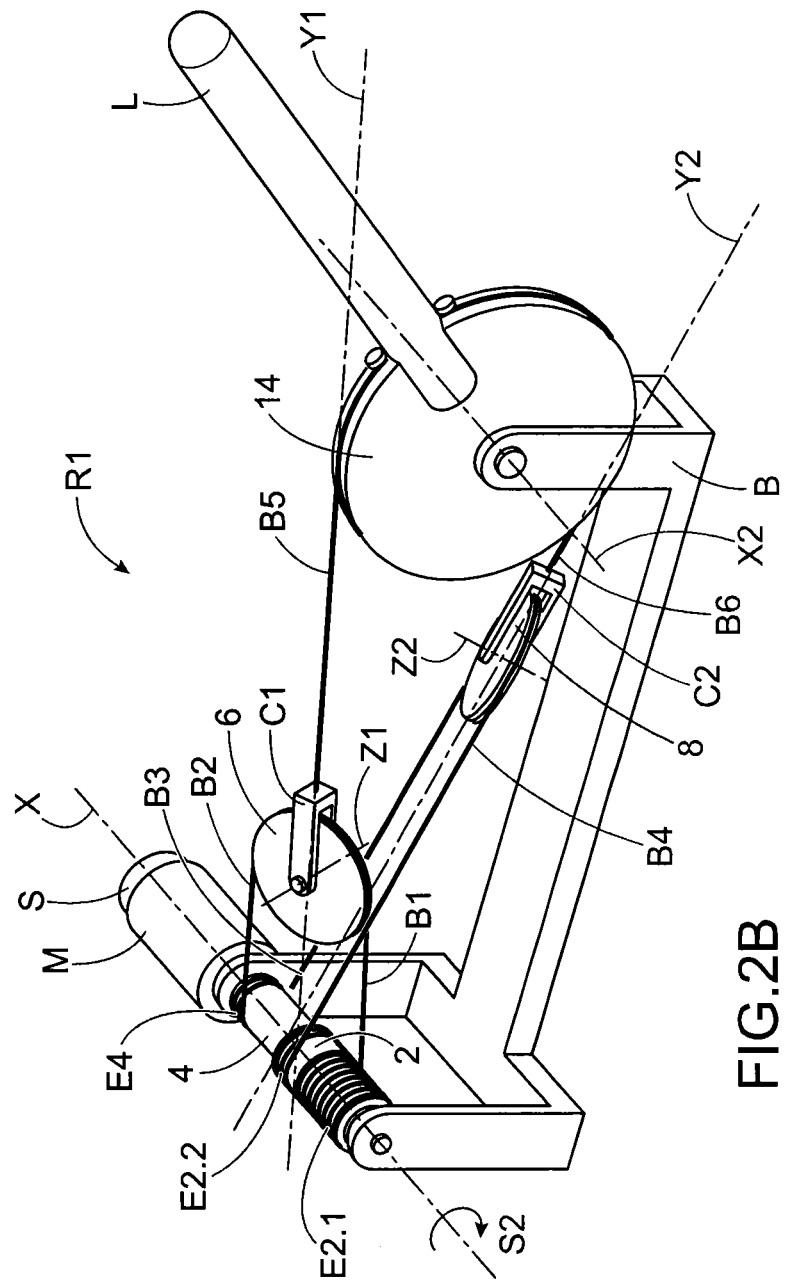

FIGS. 2A and 2B present the device of FIGS. 1A and 1B in different configurations. When the drums 2, 4 turn in a given direction, the cable 10 unwinds from the second drum 4 and winds onto the first drum 2. However, the drums 2, 4 not having the same diameter, the total length of cable situated between the drums 2 and 4 varies.

If for example the drums are driven in the direction S1, the portion of cable comprising the strands B3 and B4 unwinds from the drum 4 and winds onto the drum 2 of greater diameter, thus its length shortens and the strands of cable B3 and B4 shorten, causing a coming together of the second sheave wheel 8 from the axis X of the drums 2, 4 along the axis Y2. This movement is accompanied by a rotation of the sheave wheel 8 with respect to the yolk C2 around the axis Z2. The strand of cable 12b being linked at its end 12.2 to the yolk C2 supporting the sheave wheel 8 and at its end 12.4 to the driven wheel 14, said movement is transmitted to the driven wheel 14 which is placed in rotation around the axis X2. The member L integral with the pulley 14 is thus made to move downwards. On the contrary, the portion of cable comprising the strands B1 and B2 unwinds from the drum 2 and winds onto the drum 4 of smaller diameter. Consequently its length increases and the strands B1 and B2 of cable lengthen. The strand of cable 12a being connected at its end 12.3 to the driven wheel 14 and at its end 12.1 to the yolk C1 supporting the sheave wheel 6, the rotation of the pulley 14 around the axis X2 causes the moving away of the first sheave wheel 6 from the axis X along the axis Y1 as the strands B1 and B2 lengthen. Said movement is accompanied by a rotation of the sheave wheel 6 with respect to the yolk C1 around the axis Z1.

If, on the contrary, the drums are driven in the direction S2, the portion of cable comprising the strands B1 and B2 unwinds from the drum 4 and winds onto the drum 2 of greater diameter and the strands B1 and B2 of cable shorten, causing the coming together of the first sheave wheel 6 from the axis X. The strand of cable 12a transmits said movement to the driven wheel 14 which is placed in rotation around the axis X2, driving the member L upwards. The portion of cable comprising the strands B3 and B4, for its part, unwinds from the drum 2 and winds onto the drum 4 of smaller diameter and the strands of cable B3 and B4 lengthen. The rotation of the pulley 14 around the axis X2 is transmitted to the yolk C2 by the strand of cable 12b and causes a moving away of the sheave wheel 8 from the axis X along the axis Y2 as the strands B3 and B4 lengthen.

If the reducing device R1 with the two sheave wheels 6, 8 is considered, the rotation of the drums causes the movement of the two sheave wheels each mainly along one of the separate axes Y1 and Y2 in combination with a more limited movement along the direction of the axis X, one coming closer to the axis X of rotation of the drums and the other moving away from the axis X. Since the ends 12.1, 12.2 of the cable 12 are integral with the yolks C1, C2, and since its ends 12.3 and 12.4 are integral with the pulley 14, this movement causes the placing in rotation of the pulley 14 around the axis X2. The member L integral with the pulley 14 is thus brought into movement.

The direction of rotation of the driven wheel depends on the direction of movement of the sheave wheels along the axes Y1 and Y2 and thus on the direction of rotation of the drums. Thus, when the drums 2, 4 are moved in the direction S1, the body L is moved downwards and the free strand of cable B5 comprised between the yolk C1 and the pulley 14 shortens whereas the free strand of cable B6 comprised between the pulley 14 and the yolk C2 lengthens. Quite on the contrary, when the drums 2, 4 are moved in the direction S2, the body L is moved upwards and the strand of cable B5 lengthens whereas the strand of cable B6 shortens.

In the example represented, the strands of cable 12a, 12b are attached at their end 12.3, 12.4 to the pulley 14 by screws V3, V4 which block the cable. Any other blocking means could be used.

It should be noted that the yolks C1, C2 mainly move in the direction of lengthening Y1, Y2 of the strands of the cable 12 to which they are connected but they also undergo a transversal movement linked to the advancement of the cable 10 on the driving drums 2, 4 when they are placed in rotation as well as optionally a movement of rotation around the main axis of the strands of the cable 12 if the dimensions of the sheave wheels are not optimised.

Thus, it may be noted that, when the drums are driven in the direction S1, the winding E2.1 shortens whereas the winding E2.2 lengthens and the winding E4 moves away from the motor M. On the contrary, when the drums are driven in the direction S2, the winding E2.1 lengthens whereas the winding E2.2 shortens and the winding E4 comes closer to the motor M. Thus the spiraled winding of the cable 10 on the drums 2, 4 leads to the movement of the output points of the strands of cable B1, B2, B3, B4 of the drums along the axis X when the drums 2, 4 are driven in rotation. The cables 10 and 12 being stretched between the drums 2, 4 and the sheave wheels 6, 8, respectively between the yolks C1, C2 and the pulley 14, the angles between the axis X and the axes Y1, Y2 vary slightly during the movement to adapt to this movement. The drums 2, 4 are then advantageously arranged at a sufficient distance from the axis X2 so that the angle between the axis X and the strands of cable B1, B2, B3, B4 remains near to $\pi/2$ to avoid the cable escaping from the threads (represented in FIGS. 5A to 5D). Moreover the sheave wheels 6, 8 and the pulley 14 are advantageously grooved to ensure a correct guiding of the cables 10, 12 and to avoid their escape therefrom. To make the figures easier to read, said grooves are only represented in a schematic manner in FIGS. 1 to 4. They appear in FIGS. 5A to 5D.

The reduction ratio of the reducing device according to the present invention may be written:

$$R = \frac{2 \times r_{drivenwheel}}{(r_1 - r_2)}$$

With R the reduction ratio, $R_{driven\ wheel}$: the radius of the driven wheel calculated at the neutral axis of the cable 12, $r_1$: the radius of the drum of largest diameter calculated at the neutral axis of the cable 10, $r_2$: the radius of the drum of smallest diameter calculated at the neutral axis of the cable 10.

As an example, for a driven wheel of diameter 100 mm, a first drum of diameter 20.28 mm and a second drum of diameter 17 mm, a reduction ratio R close to 61 is obtained. A very high reduction ratio in a reasonable volume is thereby obtained. Moreover, the reducing device R1 is reversible. Thus, when the user moves the body L downwards, this provokes a movement of the drums 2, 4 in the direction S1 by the intermediary of the cable 12, yolks C1, C2, sheave wheels 6, 8 and the cable 10, movement measured by the sensor S and which the motor M can oppose. In the same way, when the user moves the body L upwards, this provokes a movement of the drums 2, 4 in the direction S2.

In the embodiment example represented, the threads are of same direction on the drums 2, 4 but they could also be of opposite direction. Furthermore, in the example represented, the diameter of the sheave wheel 6 will be advantageously selected equal to $\sqrt{(r_1+r_2)^2+d_{12x}^2}$ where $d_{12x}$ designates the distance between the projection on the axis X from the outlet point of the strand of cable B1 of the drum 2 and the projection on the axis X from the input point of the strand of cable B2 on the drum 4. In these conditions, the axis Z1 mainly undergoes a translation movement and the sheave wheel 6 does not undergo rotation around the axis Y1, which reduces the risks of collision with the surrounding cables. In the same way, the diameter of the sheave wheel 8 will be advantageously selected equal to $\sqrt{(r_1+r_2)^2+d_{34x}^2}$ where $d_{34x}$ designates the distance between the projection on the axis X from the outlet point of the strand of cable B3 of the drum 4 and the projection on the axis X from the inlet point of the strand of cable B4 on the drum 2. In these conditions, the axis Z2 mainly undergoes a translation movement and the sheave wheel 8 does not undergo rotation around the axis Y2, which reduces the risks of collision with the surrounding cables. In an even more advantageous manner, it is chosen to leave a number of dead turns between the output point of the strand B1 of the drum 2 and the input point of the strand B4 on the drum 2 substantially equal to the number of turns taken of the winding E4. The turns of the drums 2 and 4 will also have in a preferential manner an identical pitch. Thus the distances $d_{12x}$ and $d_{34x}$ are equal and the sheave wheels may be of same diameter.

In the example represented, the drum 2 has a diameter greater than the drum 4. It could also be the drum 4 that has a diameter greater than the drum 2. The drums 2 and 4 could also have equal diameters, provided that they have different rotation speeds. They could for this be decoupled and driven via transmissions or reducing devices of equal, opposite, or different reduction ratios placed between the motor M and the drums 2, 4 or at least one of them. It would further be possible to combine drums of different diameters with different drive speeds of said drums. It would thus be possible to use transmissions or reducing devices of variable reduction ratio, such as for example gear boxes or belt variators, between the motor M and at least one of the drums 2, 4, to modify the synchronisation ratio between the two drums and thus the reduction ratio during use. Said two types of devices are known to those skilled in the art and will not be detailed herein. Furthermore, they are only cited as examples and any other device making it possible to modify in a continuous or discrete manner the speed of rotation of one of the drums 2, 4 at least could be used without going beyond the scope of the invention. The control of this modification of the synchronisation ratio between the two drums will be for example ensured by the controller of the robot or the haptic interface. In this way it is advantageously possible to adapt the difference in winding and unwinding speed of the strands B1 and B2, respectively B3 and B4, and thus the reduction ratio, to the conditions encountered. Any solution ensuring a lengthening of the strands B1 and B2 coordinated with a shortening of the strands B3 and B4 falls within the scope of this invention.

The modification of the reduction ratio during use makes it possible to adjust the speed of movement of the effector or its facility to begin movement. This also makes it possible to adjust the capacity of the device to apply forces or to resist forces applied by the user on the robot or the haptic interface. Thus, on a robot, the reduction ratio could for example be decreased when it is wished to move the effector at high speed (approach phases) and to increase it when it is wished to apply important forces (work phases). In the same way, on a haptic interface or a master arm for remote operation, it is possible for example to reduce the reduction ratio in free space to increase the reversibility and the transparency of the system and increase it when it is wished to resist the movements of the user, up to blocking it completely by implementing an infinite reduction ratio. Finally, on a collaborative robot, it is possible for example to reduce the reduction ratio to increase the reversibility and the transparency of the system outside of assistance phases and to increase it when it is wished to apply important forces (user assistance phases).

Figure 3A:
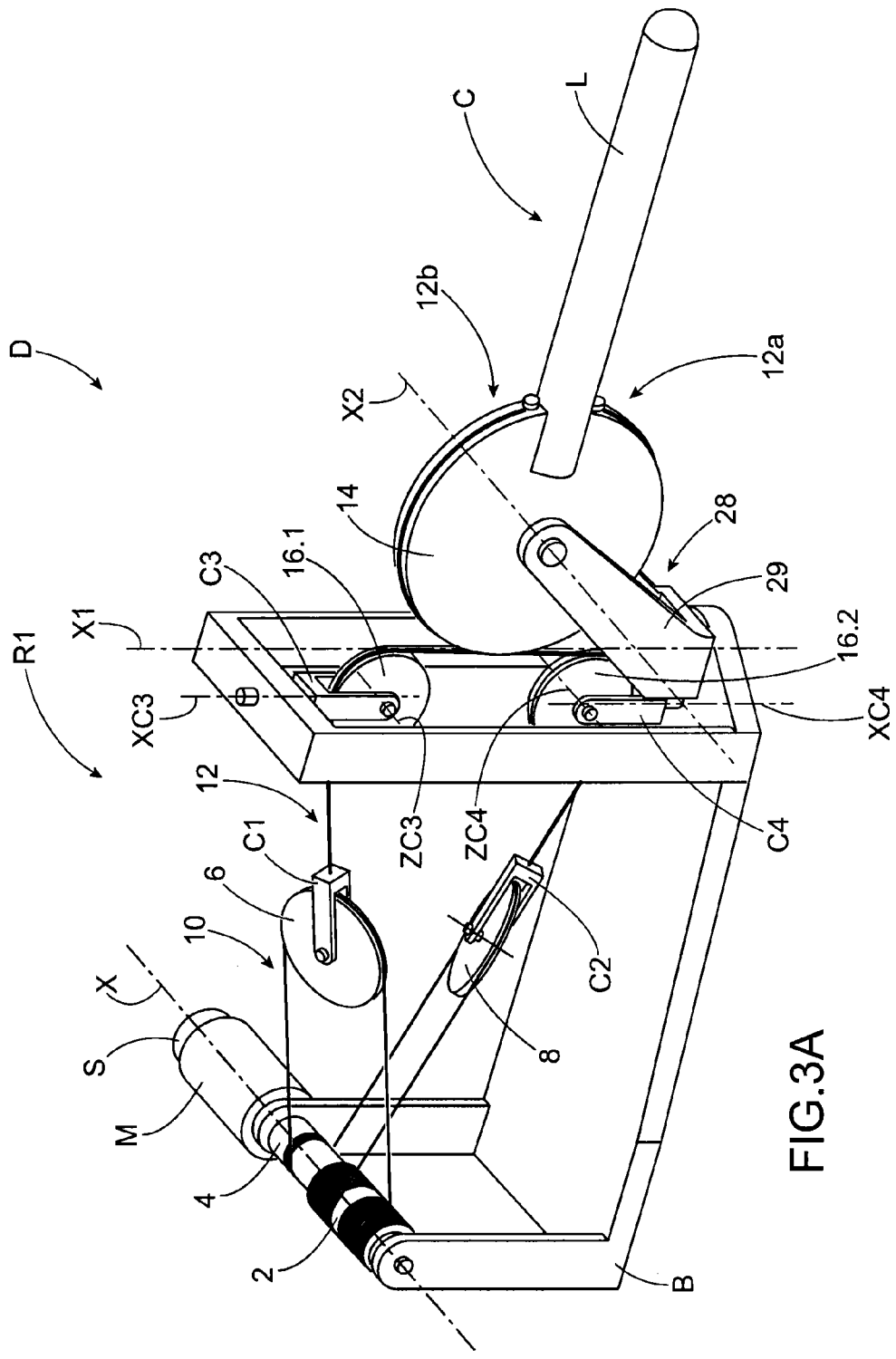
FIGS. 3A and 3B are perspective views of a second embodiment example of a device incorporating a reducing device according to the present invention.
Figure 3B:
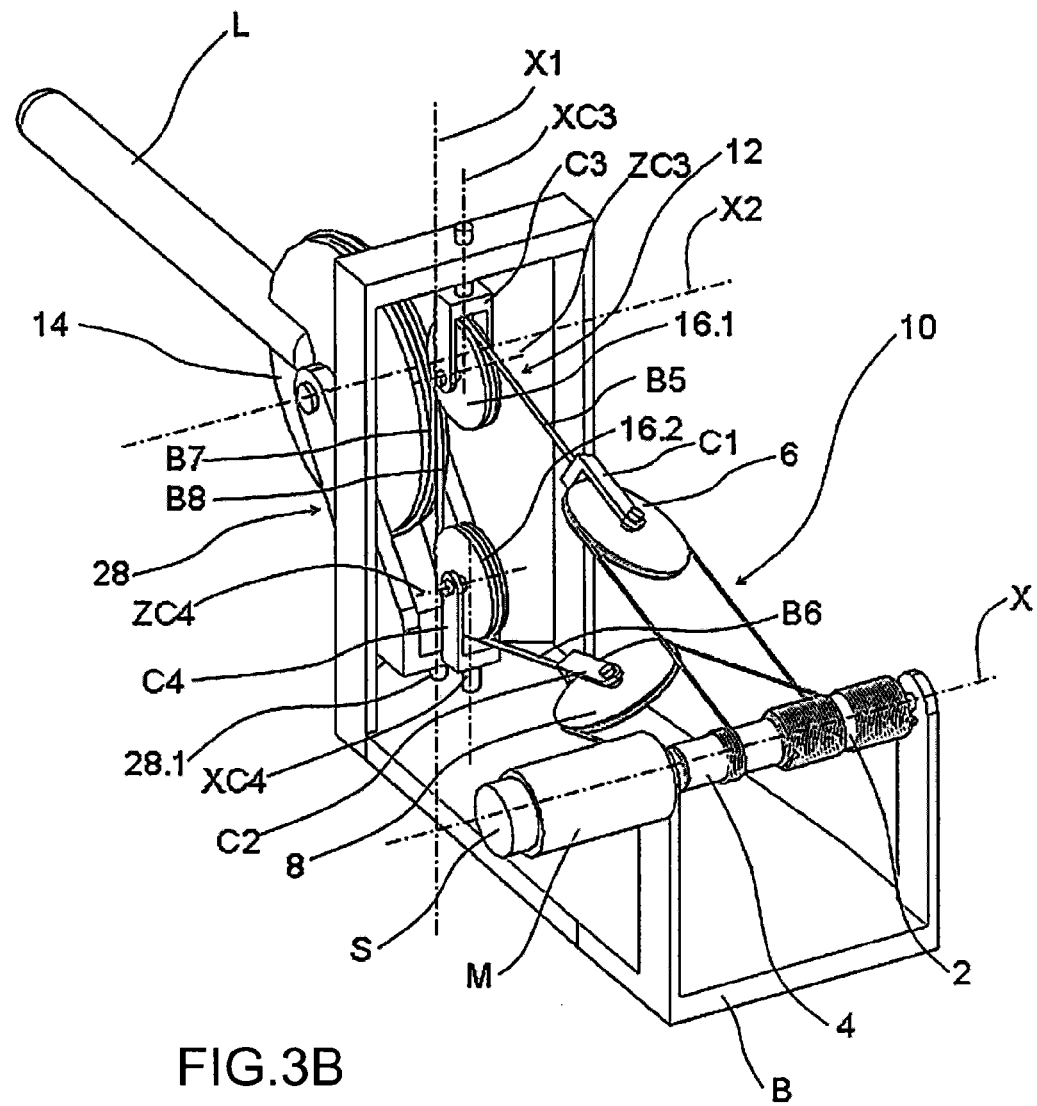

FIGS. 3A and 3B present a second example of device incorporating a reducing device according to the present invention. On said device, the body C composed in particular of the pulley 14 and the segment L is mounted in rotation around the axis X2 on a yolk 28 capable of turning at the level of its end 28.1 around an axis X1 with respect to the base B of the device. The yolk 28 may advantageously comprise two parts 29 arranged on each side of the pulley 14 to ensure a correct guiding thereof in rotation. Said device further incorporates return pulleys 16.1, 16.2 intended to guide the strands 12a and 12b of the cable 12 between the yolks C1, C2 and the pulley 14. The strand of cable 12a is attached to the yolk C1, it then comprises a first free strand B5, travels on the pulley 16.1, comprises a second free strand B7 then is wound onto the pulley 14 to which it is attached at its other end. In the same way, the strand of cable 12b is attached to the yolk C2, it then comprises a first free strand B6, travels on the pulley 16.2, comprises a second free strand B8 then is wound onto the pulley 14 to which it is attached at its other end. The portions of cable B7 and B8 pass advantageously along or near to the axis X1. Thus when the bodies 28, C turn around the axis X1 the strands of cable 12a, 12b become twisted along said axis but their length almost does not vary. Consequently, said movement around the axis X1 does not introduce any parasitic movement around the axis X2 and the movements around axes X1 and X2 are decoupled.

Advantageously, the strands B7 and B8 are slightly offset so as not to enter into collision or rub together. The pulley 14 is then advantageously provided with two parallel grooves intended to guide the strands of cable 12a, 12b.

The pulleys 16.1, 16.2 are moveable in rotation around axes ZC3, ZC4. They may also be mounted on yolks C3, C4. Said yolks C3, C4 could advantageously be moveable in rotation around axes XC3, XC4 and in translation along the axes XC3, XC4 with respect to the base B. The rotational mobility makes it possible to adjust the angle of the pulleys around the axes XC3, XC4 such that the strands of cable B5, B6 are in the plane of the pulleys 16.1, 16.2, which minimises the friction of the cable 12 on the sides of the pulleys. Said angle could be adjusted before use for example so that friction is minimised at the centre of the working space.

Said rotation could also be left free throughout the operation of the system so that friction is minimised whatever the configuration of the system. In the example represented, the axes XC3 and ZC3, respectively XC4 and ZC4, are secant, which makes it possible to use simple straight yolks. On the other hand, the axes X1 and XC3, respectively X1 and XC4 are separate. Bent yolks could also be used on which the axes XC3 and ZC3, respectively XC4 and ZC4, are not convergent, and align the axes X1 and XC3, respectively X1 and XC4.

This solution would make it possible to ensure that the pulleys 16.1, 16.2 align themselves automatically with the strands of cables B5, B6. This type of device is known to those skilled in the art and will not be detailed. The translational mobility of yolks C3, C4 may advantageously be used to tighten the cables.

The operation of the reducing device composed of the drums 2, 4, sheave wheels 6, 8, yolks C1, C2 and cables 10, 12 is identical to that of the reducing device of FIGS. 1A, 1B, 2A, 2B. The actuating direction is on the other hand opposite due to the fact of the crossing of the strands of cables 12a and 12b between the yolks C1, C2 and the pulley 14.

Like those of FIGS. 1A and 1B, the drums 2, 4 of FIGS. 3A and 3B could be decoupled, one of them at least being driven by a transmission or a reducing device placed between it and the motor M. The synchronisation ratio between the two drums could here also be equal to 1 or −1, different by 1 or −1 or variable and in this latter case be advantageously controlled by the controller of the robot or the haptic interface.

Figure 8:
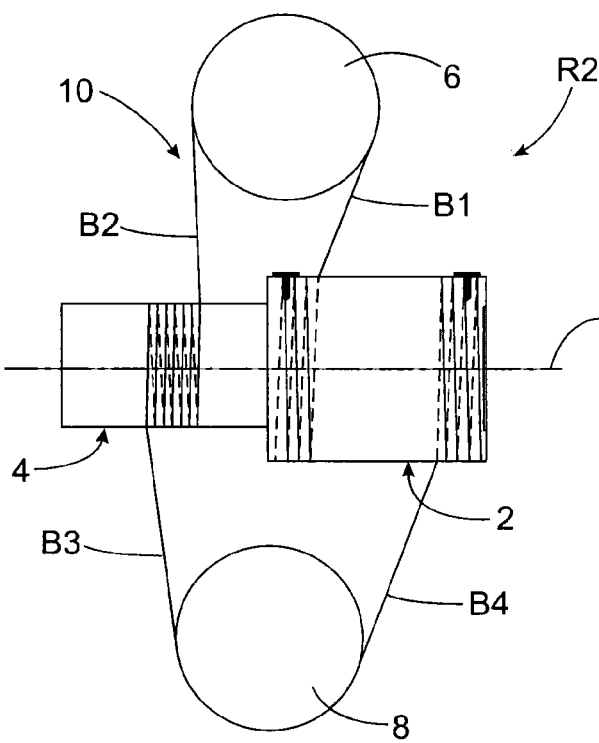
FIG. 8 is a schematic diagram of a variant of the reducing device of FIGS. 1A and 1B, FIGS. 9A to 9F are other embodiment examples of the coupling of the cable on the driving drums, the two drums having separate rotation axes.

In FIG. 8 may be seen a variant R2 of the reducing device R1 of FIGS. 1A and 3A, wherein the coupling of the cable 10 is modified with respect to that of FIGS. 1A and 3A.

In this variant, the strands B1 and B2 of the first sheave wheel 6 are situated inside strands B3 and B4 of the second sheave wheel 8. Preferably, in this embodiment variant the first and second sheave wheels have different diameters, which makes it possible to obtain parallel strands of cables B1 and B2, respectively B3 and B4.

In FIGS. 9A to 9F may be seen other embodiment examples of a reducing device according to the present invention represented in a schematic manner. For reasons of legibility, only the driving drums, the sheave wheels and the primary cable are represented in these figures. The other elements are similar to those of the preceding figures.

In these examples, the two drums 102, 104 each have a separate axis of rotation X', X".

For example, in order to synchronise the rotation of the two drums, one of the drums is directly driven by an electric motor, for example by being mounted directly on its shaft, and the other drum is driven indirectly for example by a belt or a gearing.

It may also be provided that the two drums are driven by the same motor by means of a primary mounted on the shaft of the motor and a gearing on each of the axes of drums or by a belt driving each of them. In these cases the two drums turn in the same direction.

It could also be provided to replace the belt(s) by one or more gear train(s) and in this case the two drums turn in the same direction or in opposite directions depending on the number and the arrangements of the gearings of the train(s).

Finally, it may be provided to replace the gear train(s) by one or more variable reducing device(s) such as for example and in a non-exhaustive manner gearboxes or variable reducing devices having belts. The modification of the reduction ratio of said reducing device(s) placed between the motor and the drum(s) make it possible to modify the reduction ratio of the reducing device R1 during use. Said modification could be made manually. It could also advantageously be automated and controlled by the controller of the robot or the haptic interface.

The two drums may either have different diameters, or have different rotation speeds, or have both different diameters and different rotation speeds.

The implementation of separate drums makes it possible to produce a more compact reducing device in the direction of the axis X.

In FIGS. 9A to 9F, the first drum 102 has a diameter greater than that of the second drum 104. It is understood that a first drum could be provided, the diameter of which would be less than that of the second drum or drums of same diameters driven at different speeds.

Figure 9A:
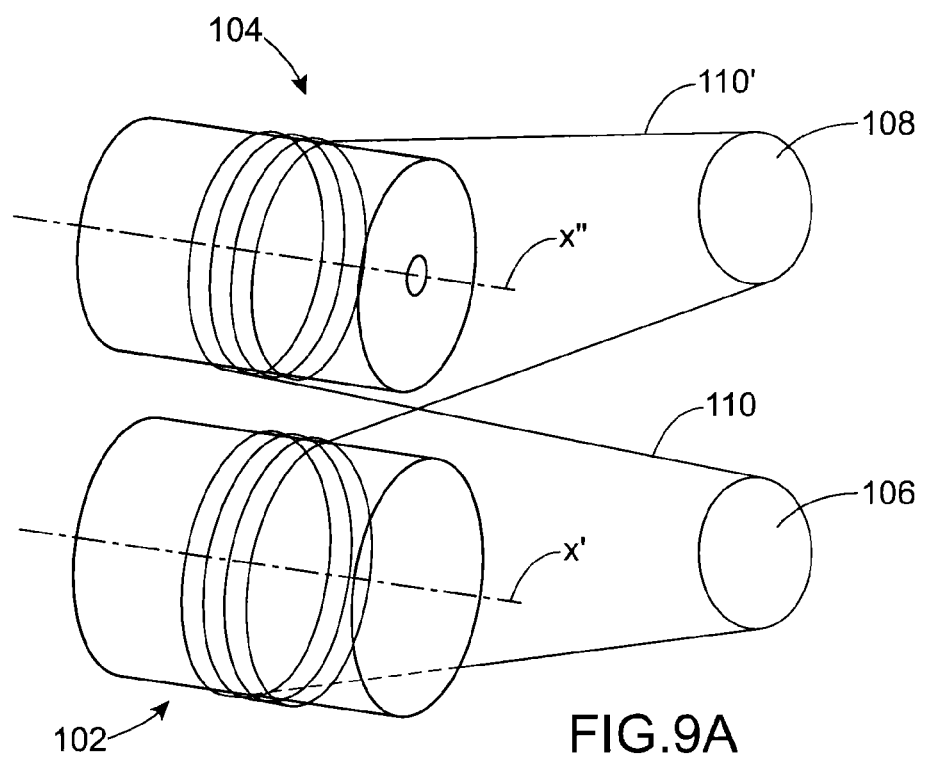

In FIG. 9A, the two drums have identical threads, each sheave wheel 106, 108 is surrounded by a cable 110, 110' wound around the central zone of the drums 102, 104. In the example represented in FIG. 9A, the cable 110, 110' has a continuous loop, which may be obtained for example by crimping together the two ends of the cable. It drives or is driven by the drums 102, 104 by friction of the cable thereon. One or the other of the strands 110, 110' or the two could also be fixed on one or the other of the drums 102, 104, or on both, for example by means of a screw blocking the cable advantageously near to the centre of the windings on the drums 102, 104. This comment also applies to the other embodiments illustrated by FIGS. 9B to 9F and 10.

In this example, the drums turn in opposite directions and the windings of the cable 110, 110' on the drums 102 and 104 move in opposite directions along the axes X', X" when the device is started.

The threads of the two drums could also advantageously be opposite, without going beyond the scope of the invention. In this case the drums would always turn in opposite directions but the windings of the cable 110, 110' on the drums 102 and 104 would move in the same direction along the axes X', X" when the device is started.

Figure 9B:
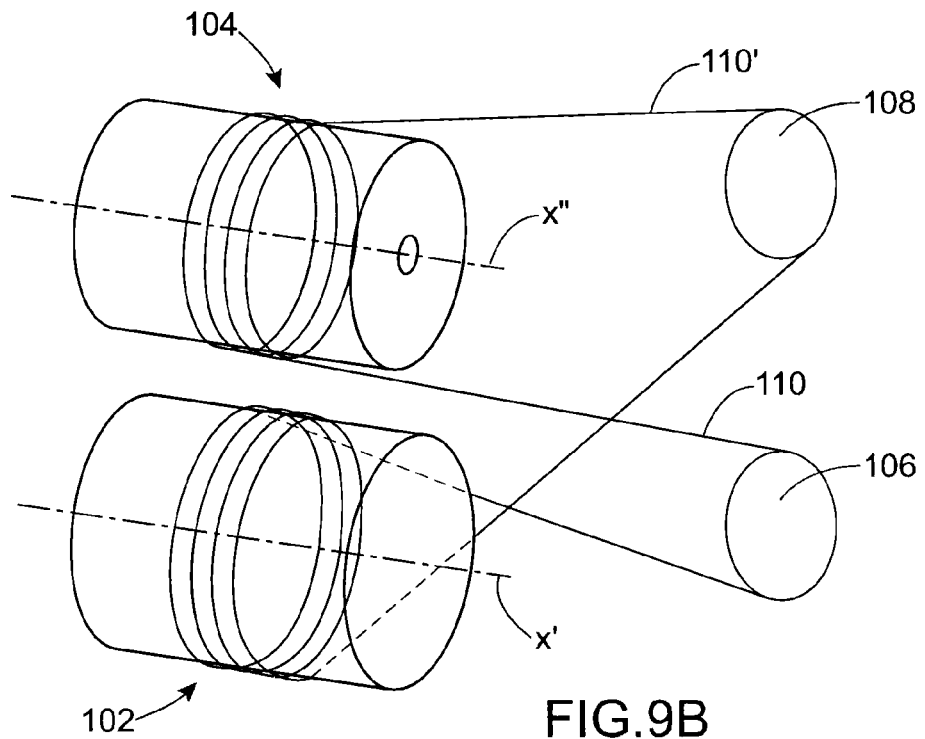

In FIG. 9B, the threads of the two drums are opposite, each sheave wheel 106, 108 is surrounded by a cable 110, 110' fixed in the central zone of the drums 102, 104. In this example, the drums turn in the same direction and the windings of the cable 110, 110' on the drums 102 and 104 move in opposite directions along the axes X', X" when the device is started.

The threads of the two drums could also advantageously be identical. In this case the drums would always turn in the same direction but the windings of the cable 110, 110' on the drums 102 and 104 would move in the same direction along the axes X', X" when the device is started.

Figure 9C:
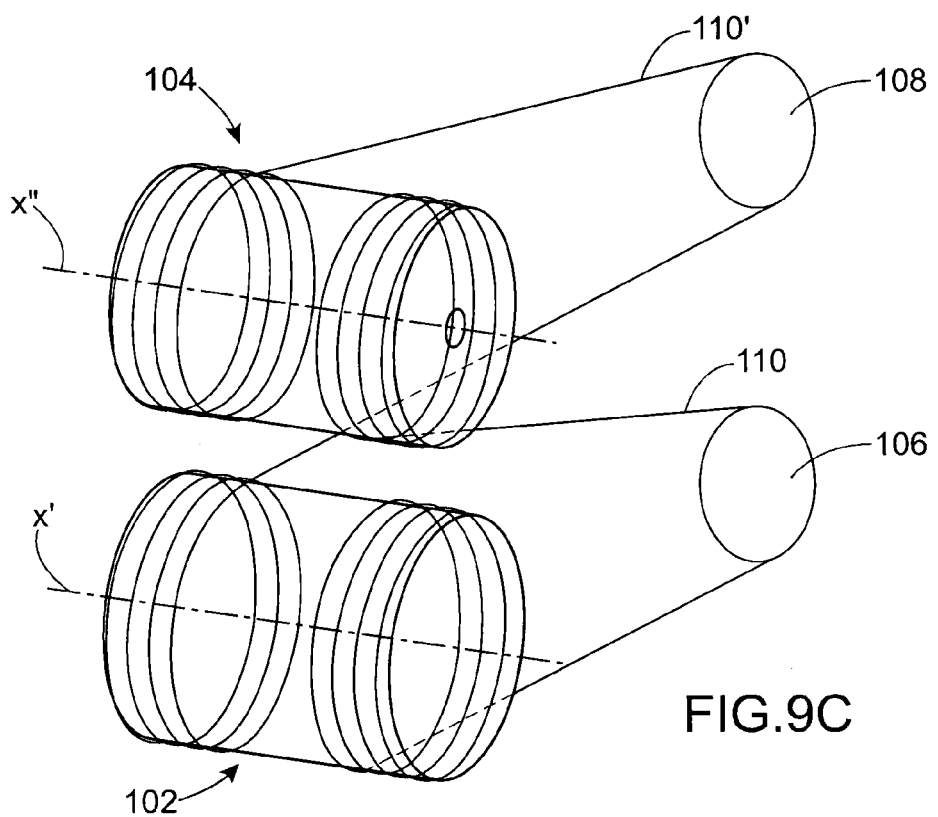

In FIG. 9C, the two drums have identical threads, each sheave wheel 106, 108 is surrounded by a cable 110, 110' fixed by its ends to the longitudinal ends of each of the drums 102, 104. In this example, the drums turn in opposite directions. The longitudinal ends to which each cable 110, 110' is fixed are situated on the same side with respect to a median plane of the drums.

Figure 9D:
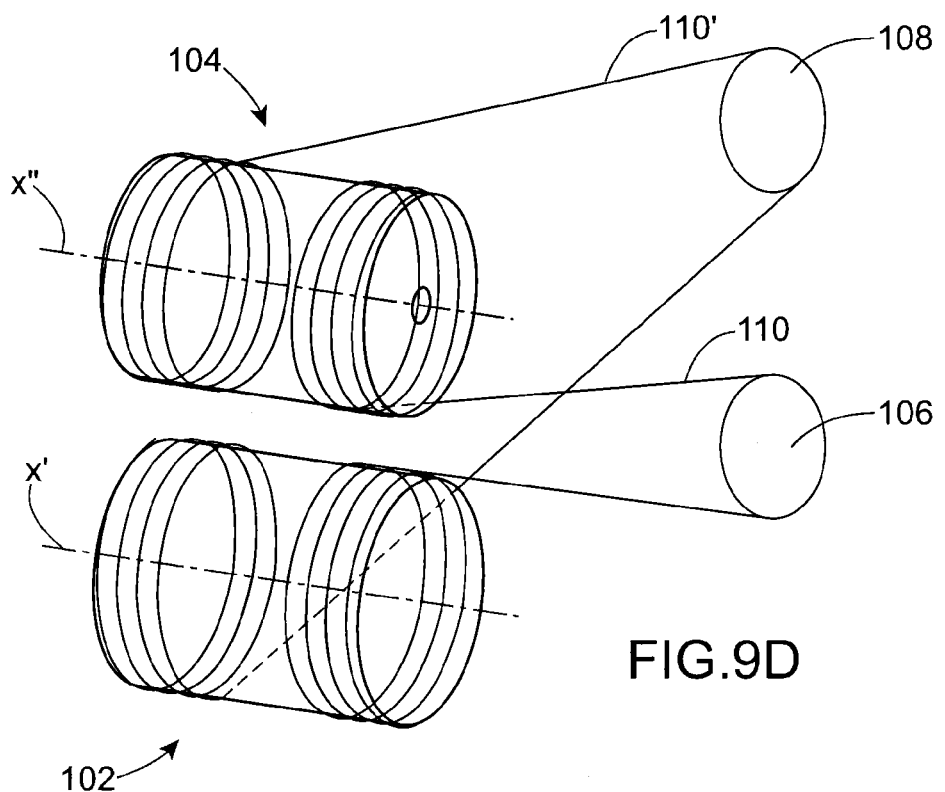

In FIG. 9D, the threads of the two drums are opposite, each sheave wheel 106, 108 is surrounded by a cable 110, 110' fixed by its ends to the longitudinal ends of each of the drums 102, 104. In this example, the drums turn in the same direction. The longitudinal ends to which each cable 110, 110' is fixed are situated on the same side with respect to a median plane of the drums.

Figure 9E:
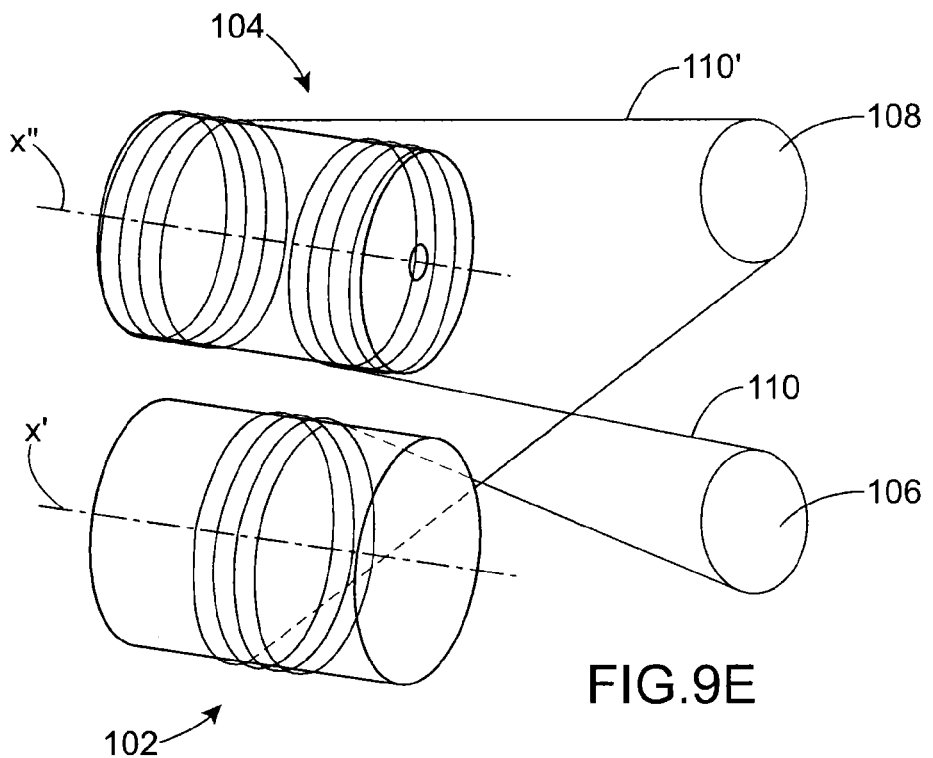

In FIG. 9E, the two drums have identical threads. The first sheave wheel 106 is surrounded by a cable 110 fixed by one of its ends to a first longitudinal end of the second drum 104 and wound at the level of the median zone of the first drum 102. The second sheave wheel 108 is surrounded by a cable 110' fixed by one of its ends to a second longitudinal end of the second drum 104 opposite to the first longitudinal end, and wound at the level of the median zone of the first drum 102. In this example, the drums turn in the same direction. The cable 110, 110' may be formed of a single strand of cable. In this case, it is possible either to fix it on the drum 102 or drive the drum by friction of the cable thereon. The cable 110, 110' may also be formed of two strands of cable each fixed on the drum 102.

Figure 9F:
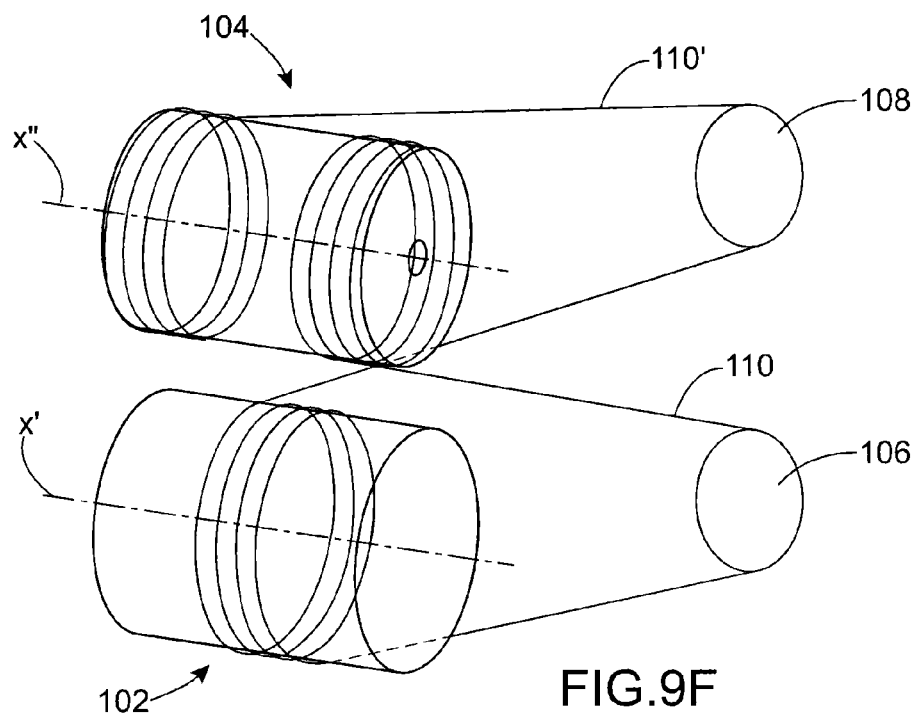

In FIG. 9F, the two drums have opposite threads. The first sheave wheel 106 is surrounded by a cable 110 fixed by one of its ends to a first longitudinal end of the second drum 104 and to a median zone of the first drum 102. The second sheave wheel 108 is surrounded by a cable 110' fixed by one of its ends to a second longitudinal end of the second drum 104 opposite to the first longitudinal end and to the median zone of the first drum 102. In this example, the drums turn in opposite directions.

In the embodiment examples represented, the axes X', X" are parallel. They could also be arranged along any angle in space, for example to facilitate the incorporation of the device, providing suitable angle return means such as belts or bevel gears for example are used.

It is clearly understood that all of the examples presented in FIGS. 9A to 9F could be adapted in the case where the axes of the drums 102, 104 are aligned, whether the drums are integral or not. Thus the cable 10 of the devices of FIGS. 1A and 3A could for example be attached at the centre of the two drums 2, 4 with threads in opposite or identical directions or on the edges of the two drums 2, 4 with threads in opposite directions.

Figure 10:
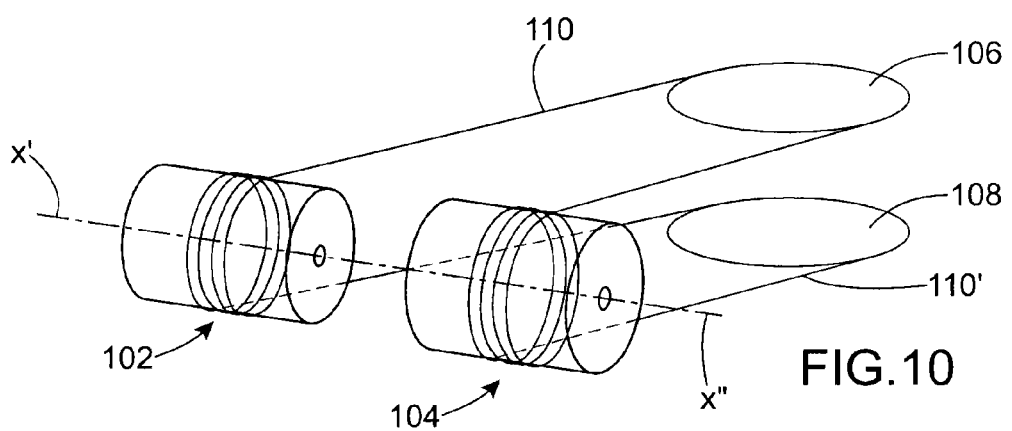
FIG. 10 is a variant of the reducing device of FIG. 9A, in which the axes of rotation of the drums are merged.

In FIG. 10 may be seen yet another very similar embodiment variant of the reducing device of FIG. 9A, in which the two drums 102, 104 are separate and their axes X', X" of rotation are aligned. For example, the driving of the two drums is obtained by a single motor and a differential arranged between the two drums. The differential, which is well known to those skilled in the art and not represented for reasons of clarity, comprises for example a bevel gear at the output of the shaft of the motor and a bevel gear mounted on each axis of a drum. The two drums then turn in opposite directions.

All of the configurations represented in FIGS. 9A to 9F are applicable to the variant of FIG. 10.

All of the configurations of FIGS. 9A to 9F and 10 are moreover compatible with a use within the scope of the devices of FIGS. 1A and 3A.

Figure 11A:
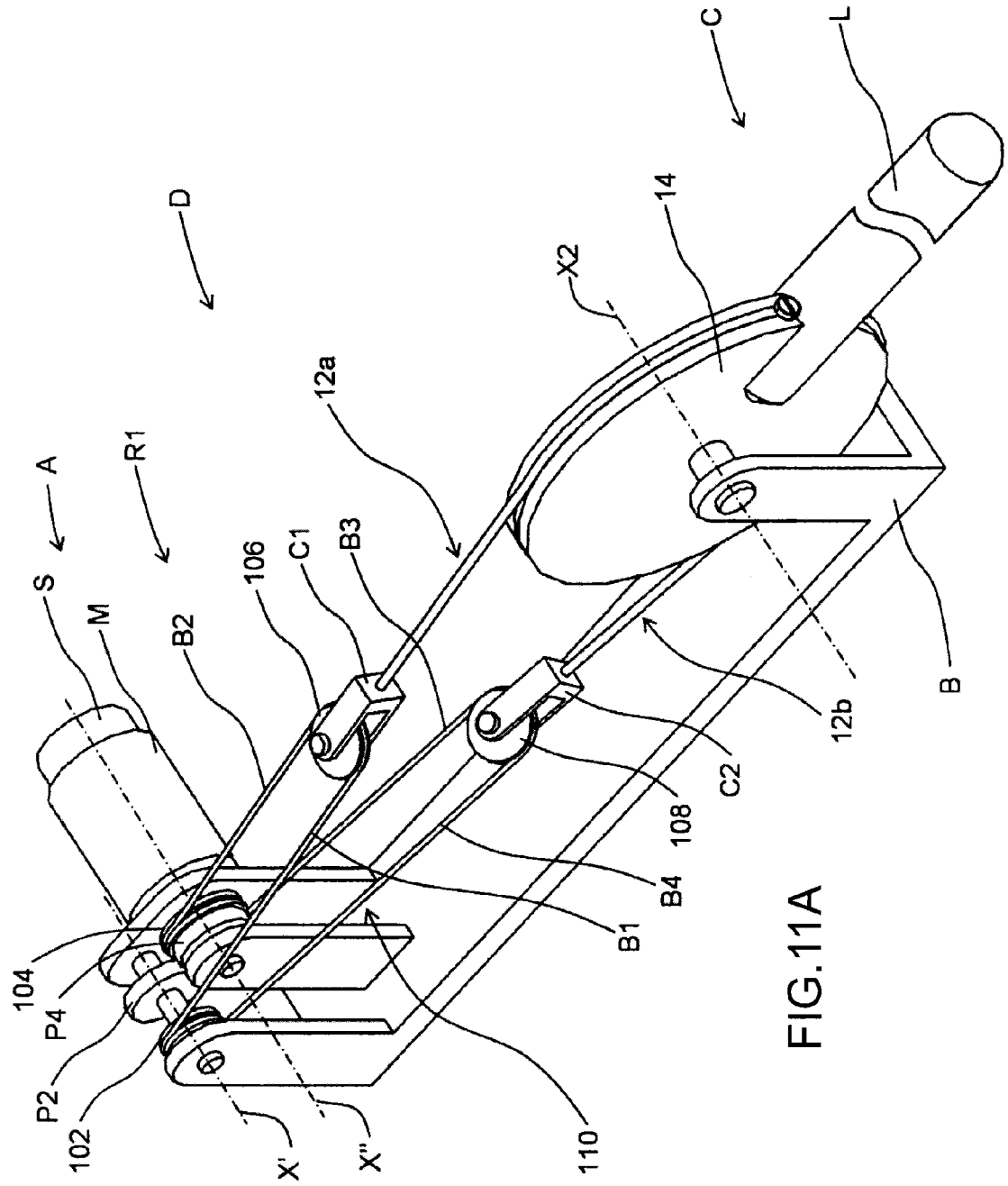
FIG. 11A is a perspective view of another embodiment example of a device incorporating a reducing device according to the present invention, wherein the movements of the drums are transmitted to the sheave wheels by a belt.

FIG. 11A presents another embodiment example of a device D incorporating a reducing device R1 according to the present invention. On this device, the reducing device R1 comprises a belt 110 composed of a first portion which winds onto the drum 102 moveable in rotation with respect to the base around the axis X', a first free strand B1 going from the first drum 102 to the first sheave wheel 106, a portion which winds onto the sheave wheel 106, a second free strand B2 going from the sheave wheel 106 to the second drum 104 moveable in rotation around an axis X" advantageously parallel to the axis X', a portion which winds onto the drum 104, a third free strand B3 going from the drum 104 to the second sheave wheel 108, a portion which winds onto the sheave wheel 108 and a fourth free strand B4 going from the sheave wheel 108 to the first drum 102. The belt 110 forms a closed loop.

The belt 110 may be of round, trapezoidal, square or rectangular section, or of any other section of existing belt, with drive burrs or not. FIG. 11A illustrates the case of a belt of round section. The drums 102 and 104 as well as optionally the sheave wheels 6 and 8 may advantageously be provided with grooves to guide the belt and notches to facilitate its coupling and to prevent it slipping. Said grooves will thus be advantageously machined according to the negative imprint of the belt.

In the example represented in FIG. 11A, the axes X', X" and X2 are parallel and the diameters of the drums 102 and 104 are selected such that the planes tangent to the drum 102 and to the pulley 14 are merged with the planes tangent to the drum 104 and to the pulley 14. In these conditions, the sheave wheels 106 and 108 remain in said planes and do not turn around axes of the strands of cable 12a and 12b, which limits the twisting of the free strands of the belt.

The device D is also provided with a motor M equipped with a position sensor S, which may be and in a non-exhaustive manner all of the types presented previously. The drum 104 may be advantageously connected to the rotor of the motor M, the stator of which may be fixed on the frame B. In the example of FIG. 11A, a pulley P4 is mounted on the rotor of the motor M rotationally integral with the drum 104 around the axis X". A second pulley P2 is mounted on the axis of the drum 102 rotationally integral with the drum 102 around the axis X'. The pulleys P4 and P2 make it possible to transmit the movements and the forces of the motor M to the drum 102, so that the drums 102, 104 have opposite directions of rotation. The motor M thus makes it possible to drive the drums 102 and 104 or to resist the movements thereof. In the example represented, the motor M is directly connected to the drum 104 and indirectly to the drum 102 but it could be the opposite. The motor M could also be connected to the two drums by transmission means or reducing devices. In the example represented, the pulleys P2 and P4 have the same diameter and the drums 102 and 104 turn in opposite directions at the same speed around the axes X' and X". In this example, the drum 102 has a diameter less than the drum 104 but this could also be the opposite. The pulleys P2 and P4 could also have different diameters, the drums 102 and 104 having in this case identical or different diameters. The pulleys P2 and P4 are for example connected by a belt, or are formed of rubbing rollers, or a gear train, of fixed or variable reduction ratio and advantageously controlled by the controller of the device D. The other elements of the device of FIG. 11A are similar to those of FIG. 1A and will not be detailed herein.

The operation is similar to that of the device of FIG. 1A. When the motor M is controlled in rotation, the difference in diameter between the drums 102 and 104 and/or their difference in speed causes a lengthening (a shortening) of the portion of the belt 110 comprising the free strands B1 and B2 simultaneously with a shortening (a lengthening) of the portion of belt comprising the free strands B3 and B4. The sheave wheel 106 then moves away from (comes closer to) the axes X' and X" whereas the sheave wheel 108 comes closer (moves further away). The yolks C1 and C2 supporting the sheave wheels 6 and 8 being connected to the driven wheel 14 by the portions of cables 12a and 12b, said movement causes the rotation of the driven wheel 14 around the axis X2.

Conversely, the system being reversible, any rotation of the driven wheel 14 is transmitted by the cable 12 to the yolks C1 and C2 which are driven in translation along the axes of the strands of cable 12a and 12b. This movement is transmitted by the cable 110 to the drums 102 and 104 which drive the motor M in rotation around the axis X".

The winding of the belt 110 around drums 102, 104 and sheave wheels 106, 108, is advantageously less than 1 turn, so that the free strands B1, B2, B3, B4 do not cross over. The groove or imprint guiding the belt on the drums and the sheave wheels may then advantageously be toroidal and not helicoidal. In these conditions, the belt does not advance along the axes X' and X" when the drums 102, 104 turn around said axes. The length of the belt is thus constant, as is its tension, which can for example be adjusted by means of an adjustment system placed at the level of the coupling of the cable 12 on the yolks C1 and C2. Such a tensioning system is well known to those skilled in the art and will not be detailed herein. Furthermore, in these conditions, the motor M can make an infinite number of turns without this being disadvantageous to the system. This solution is thus particularly suitable for very large reduction ratios for which the motor makes a very large number of turns with respect to the driven wheel.

Figure 11B:
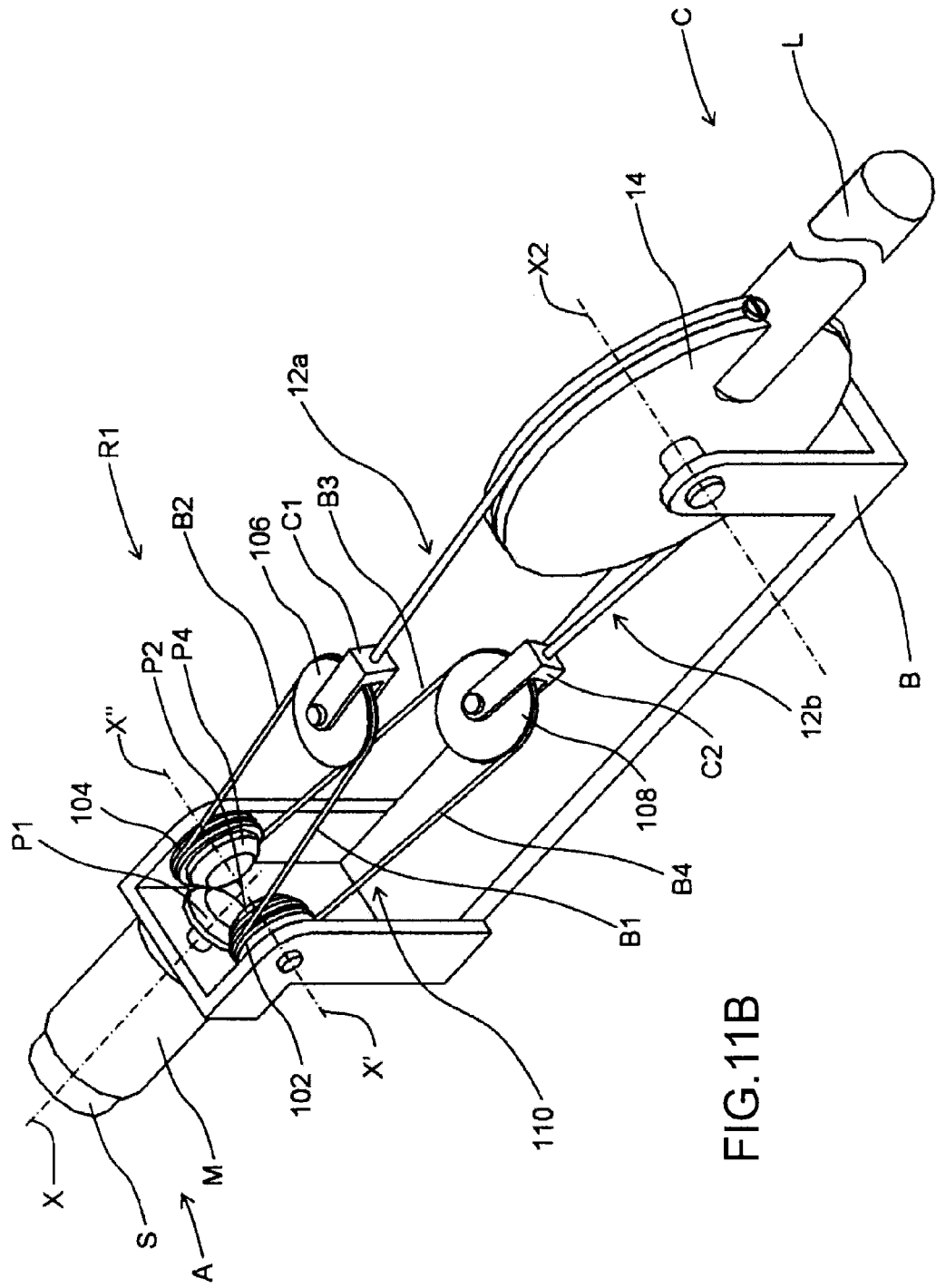
FIG. 11B is a perspective view of a variant of the device of FIG. 11A.

FIG. 11B presents an embodiment variant of the device of FIG. 11A. On this device, the motor M is mounted at the rear of the drums 2 and 4 and turns around an axis X. This arrangement is only given by way of example and the motor could also for example be arranged under the axes X' and X". Its rotor is connected to a conical pulley P1 whereas its stator is advantageously fixed on the frame B. The drum 102 is rotationally integral with a conical pulley P2 turning at the same time as it around the axis X'. In the same way, the drum 104 is rotationally integral with a conical pulley P4 turning at the same time as it around the axis X".

The assembly constituted of the pulleys P1, P2 and P4 constitutes a differential which makes it possible to drive the drums 102 and 104 or to resist their movement with the motor M. The operation of this device is similar to that of the system of FIG. 11A.

In the example represented in FIG. 11B, the pulleys P1, P2 and P4 are identical and the drums 102 and 104 have different diameters. The drums 102 and 104 could also have the same diameter. In this case, the pulleys P2 and P4 would have different diameters. It would also be possible that the pulleys P2 and P4 as well as the drums 102 and 104 have different diameters. The pulleys P1, P2 and P4 may for example be gearings or conical rollers.

The devices of FIGS. 11A and 11B are only given as examples of reducing device with high reduction ratio having a belt and secondary cable.

Any other configuration of the pulleys P1, P2, P4 or the transmission or reduction means taking their place, drums 102, 104, and the actuator A are within the scope of this invention, provided that the movement of the motor M causes a lengthening (a shortening) of the strands B1 and B2 simultaneously with a shortening (a lengthening) of the strands B3 and B4 leading to a variation in the opposite direction of the distance between the sheave wheels 106 and 108 and the axes X' and X" and a placing in movement of the driven pulley 14 through the intermediary of the secondary cable 12.

Figure 4:
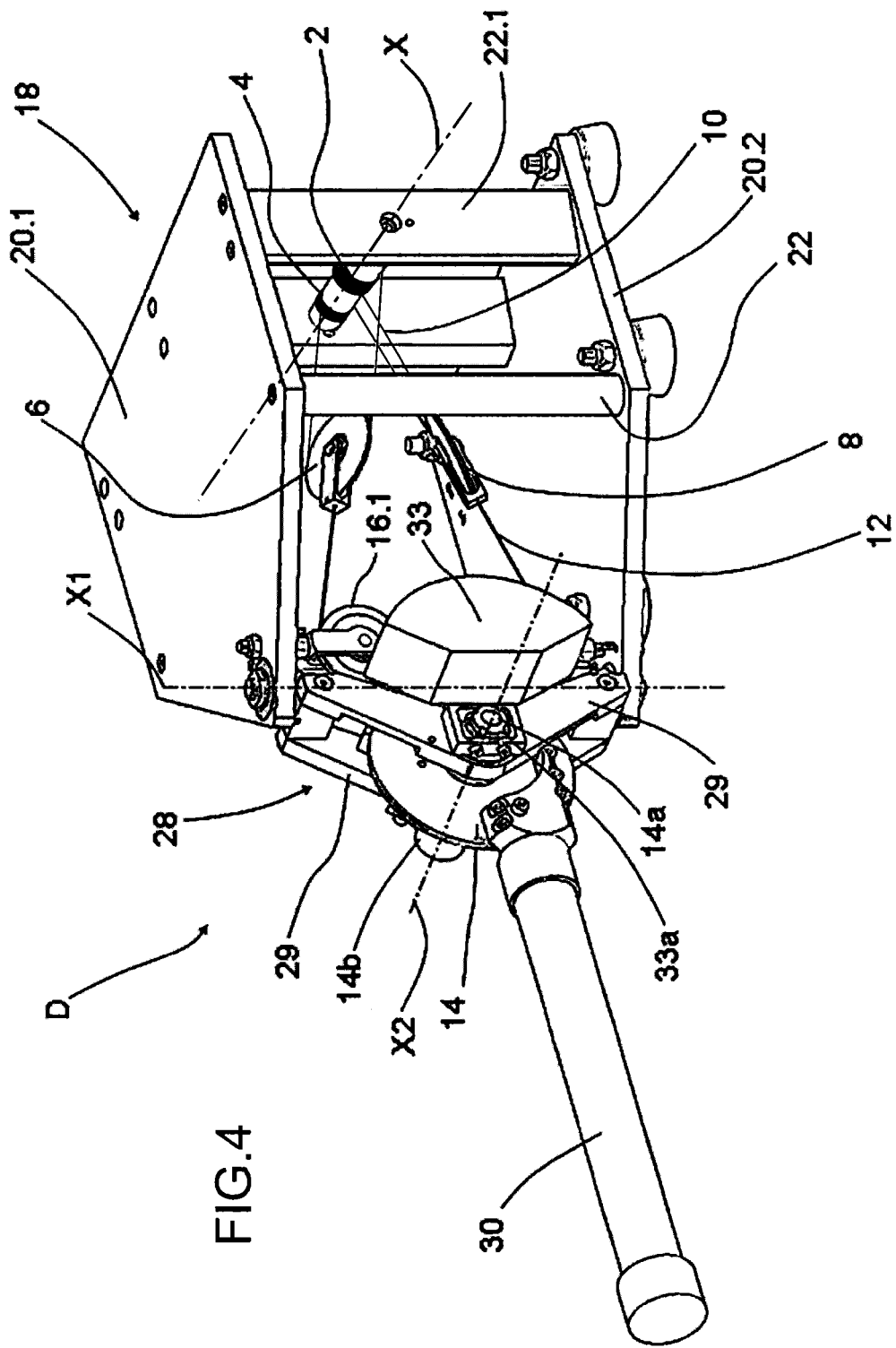
FIG. 4 is a perspective view of an industrial embodiment of the complete system of FIGS. 3A and 3B, FIGS. 5A to 5D are side, rear, frontal and top views of the system of FIG. 4.

In FIGS. 4 and 5A to 5D may be seen an industrial embodiment example of a device D incorporating a reducing device according to the present invention, the reducing device being of the type represented in FIGS. 3A and 3B. The cables are not represented in FIGS. 5B to 5D. The structure of FIG. 4 is particularly suitable to the embodiment of a robot or a haptic interface as will be seen hereafter.

The structure of the device D of FIG. 4 comprises a chassis 18 on which are mounted the elements of the reducing device.

The chassis 18 comprises an upper plate 20.1 and a lower plate 20.2 substantially parallel rigidly connected by shafts 22. In the example represented, the plates have the shape of pentagons.

Figure 5B:
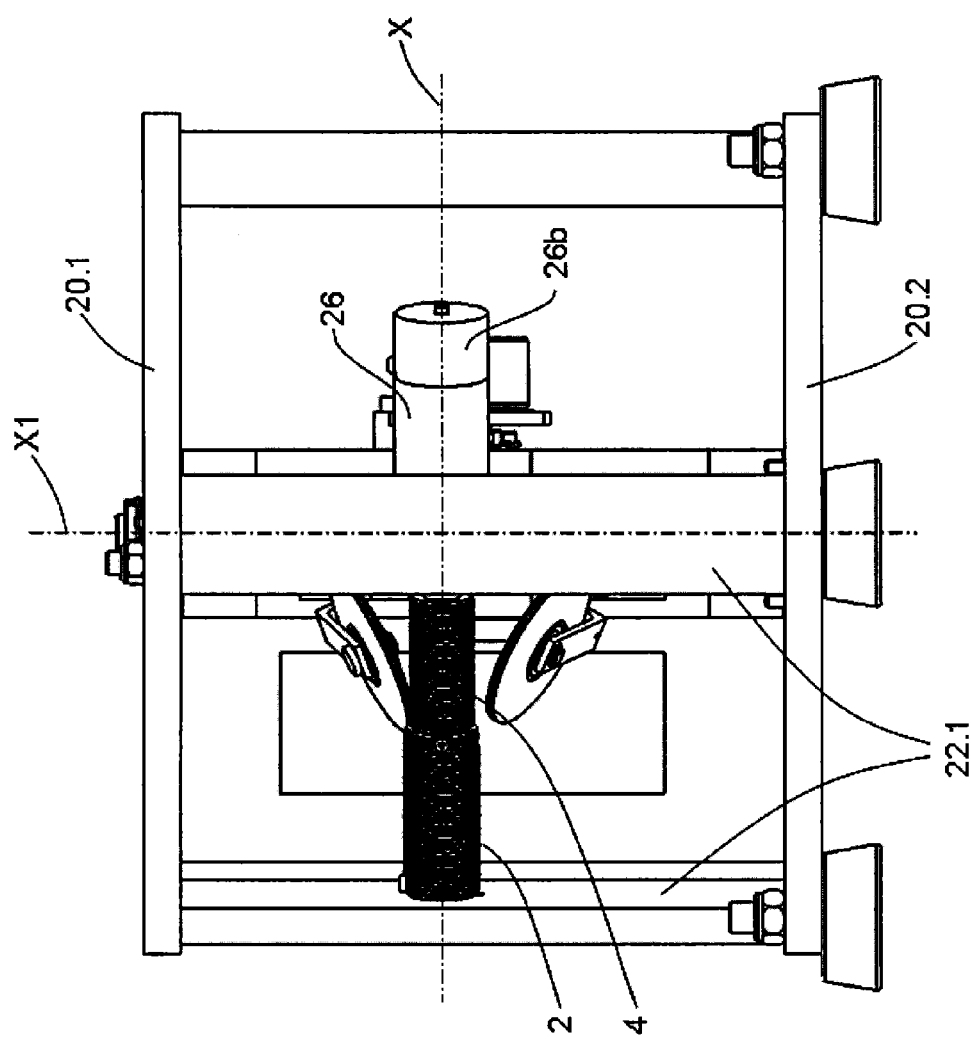

In the example represented, two uprights 22.1 form the supports in rotation for the drums 2, 4 particularly visible in the rear view of FIG. 5B. In this example, the drums 2, 4 are rotationally integral and in direct drive with the shaft of a motor 26 which is situated on the other side of an upright 22.1 with respect to the drums. The motor 26 is equipped with an angular position sensor 26b making it possible to measure the rotation of the drums 2, 4.

The first and second sheave wheels 6, 8 as well as their yolks are situated between the two plates 20.1, 20.2. A return pulley 16.1 is fixed through the intermediary of its yolk to the upper plate 20.1, and the other return pulley 16.2 is fixed through the intermediary of its yolk to the lower plate 20.2.

Figure 5C:
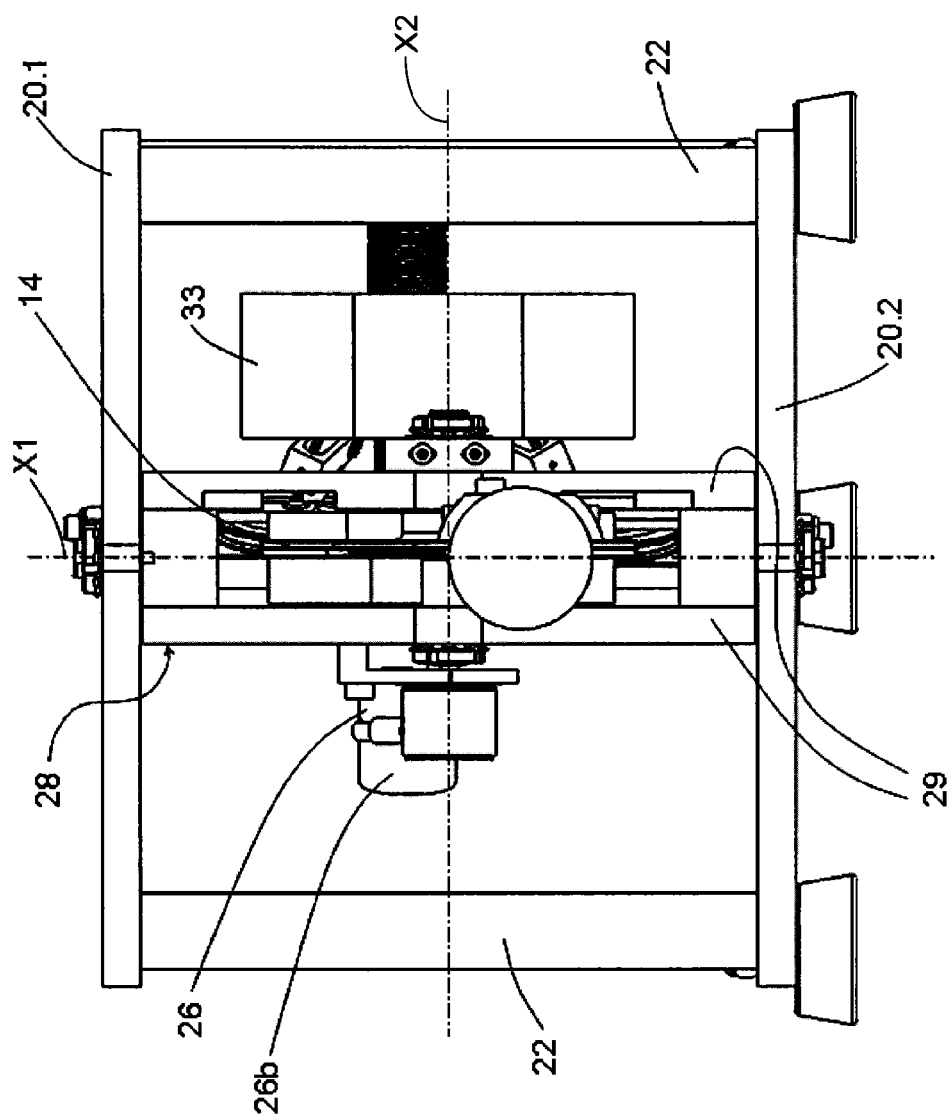
Figure 5D:
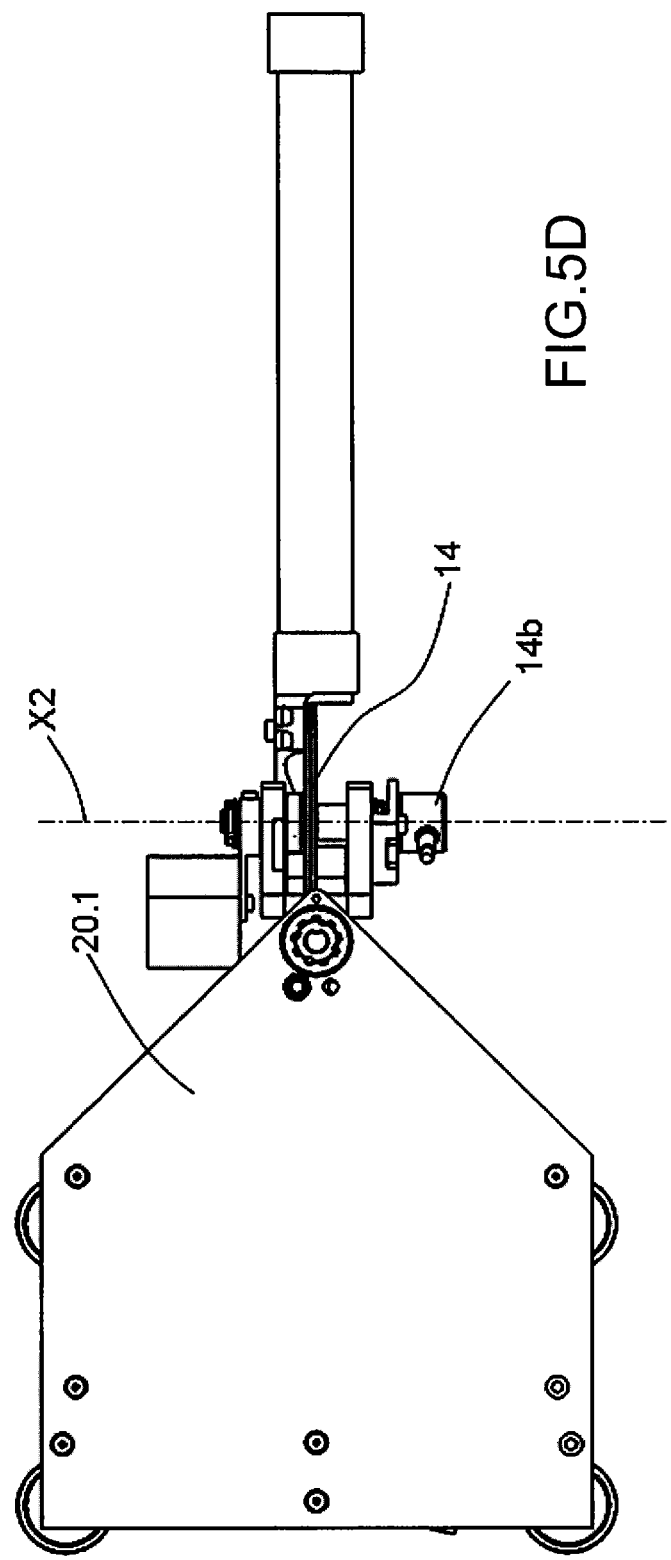

The driven wheel 14 is mounted moveable in rotation around its axis X2 on a yolk 28 itself moveable in rotation with respect to the base around an axis X1 advantageously perpendicular to the axis X2 and extending vertically in FIGS. 5A to 5C. The yolk 28 is hinge mounted between the lower plate and the upper plate. In the example represented, the yolk is situated at the level of a point of the pentagons opposite the uprights 22.1.

The yolk 28 comprises two parts 29 mounted in rotation on the upper 20.1 and lower 20.2 plates around the axis X1. Bearings are advantageously provided at the level of the hinge of axis X1 between the yolk 28 and the plates 20.1, 20.2 and at the level of the hinge of axis X2 between the yolk 28 and the driven wheel 14.

In the example represented, an elongated part 30 is fixed on the driven wheel 14 so as to be driven in rotation around the axis X2 by rotation of the driven wheel 14 and around the axis X1 by rotation of the yolk 28. Said elongated part 30 may form an arm of a robot or a haptic interface.

Figure 6:
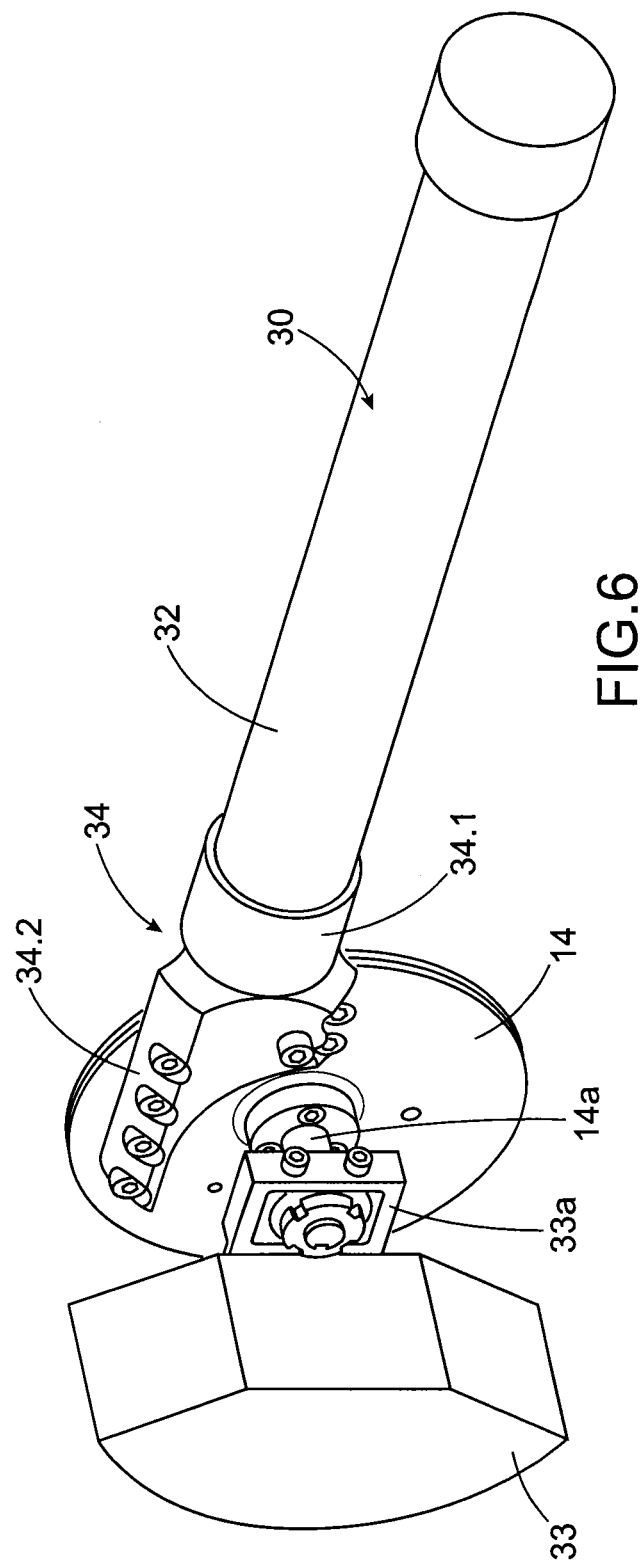
FIG. 6 is a detailed view of the fixation zone between the elongated member and the driven wheel.

In FIG. 6 may be seen an example of fixation of the elongated part 30 on the driven wheel 14.

For example, the elongated part 30 comprises a tube 32 and a connecting element 34 wherein is mounted a longitudinal end of tube 32.

The connecting element 34 has a first tubular part 34.1 to receive the tube and a second part out of axis 34.2 with respect to the axis of the tube, said second part is intended to be fixed on the driven wheel 14. This embodiment has the advantage of enabling a fixation on the side of the driven wheel without hindering the movement of the driven wheel and without implementing a yolk. It is obviously understood that a rotational fastening of the elongated part 30 to the driven wheel 14 by means of a yolk does not go beyond the scope of the present invention.

In the example represented, the second part 34.2 has a tapered shape.

In the example represented, the connecting element is fixed on the driven wheel by six screws.

The tube 32 is for example made of carbon and the connecting element is made of aluminium.

It is understood that other means for fixing the arm on the pulley could be provided.

A counterweight 33 is provided on the driven wheel 14 to ensure the static balancing of the set of parts moveable around the axis X2. This counterweight is fixed on a shaft 14a integral with the pulley 14 and is moveable in rotation with respect to the body 28 at the same time as the pulley 14. A part 33a is used to fix the counterweight 33 on the shaft 14a.

Said part makes it possible to adjust the position of the counterweight with respect to the shaft in order to balance the arm. The counterweight is then blocked in the desired position.

In the example represented, a second angular position sensor 14b is placed between one of the parts 29 and the shaft 14a of the pulley 14 so as to measure its rotation around the axis X2. This sensor, not obligatory, supplies complementary measurements on the state of the system and may make it possible for example to measure and/or partially compensate the defects linked to the flexibility of the cables 10, 12.

Figure 7:
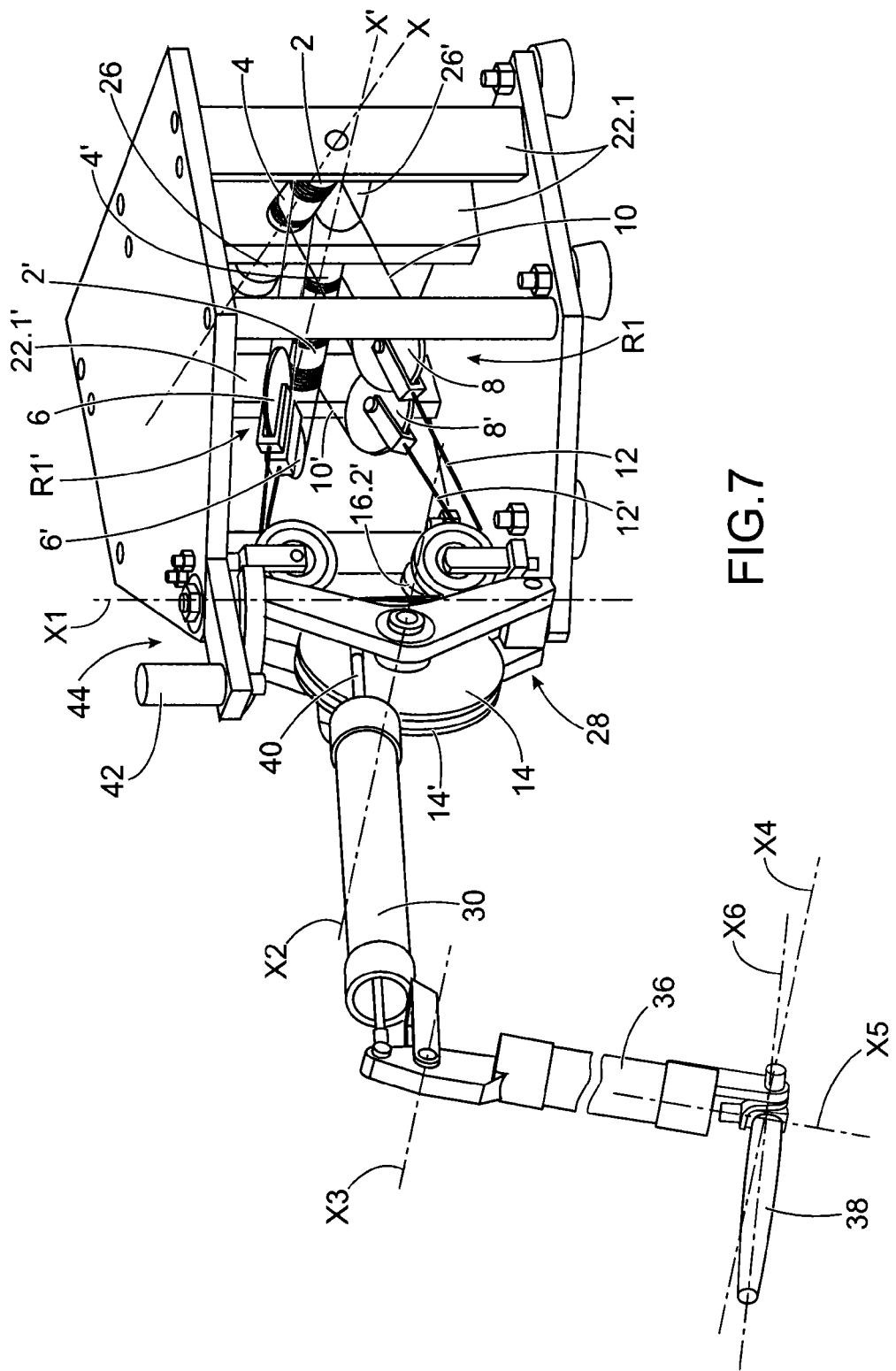
FIG. 7 is a view of an embodiment example of a robot comprising two reducing devices according to the present invention.

Advantageously, the axis X1 is arranged to the rear of the axis X2, respectively the axes X2 and X3 of FIG. 7. The device is then of simpler embodiment and the axis 1 may be positioned horizontally. In fact, on account of the high reduction ratio that may be obtained thanks to the reducing device according to the invention, the driven wheel 14 may be of low diameter. The counterweights may be placed outside of the driven sectors and to the rear of the axis X1, which facilitates its balancing. It is then no longer necessary to position it vertically.

In FIG. 7 may be seen an embodiment example of a device that can form a robot or a haptic interface according to the present invention.

The device of FIG. 7 comprises an arm 30 and forearm 36 assembly. The forearm 36 is hinged on the free end of the arm 30 around an axis X3. The arm is, for its part, hinged around the axis X2 and the yolk 28 around the axis X1.

The device of FIG. 7 reproduces the structure of FIG. 4 which is used here to actuate the forearm around the axis X3, and to which have been added means of actuating the arm around the axis X2.

In the example represented, the movement of the wheel 14' on which is fixed the arm 30 around the axis X2 is obtained through the intermediary of a reducing device R1' according to the present invention, the movement of the wheel 14 which drives the forearm around the axis X3 being obtained through the intermediary of a reducing device R1 similar to that of FIG. 4.

The second reducing device R1' is of similar embodiment to the reducing device R1. An additional upright 22.1' extending between the lower plate and the upper plate has been added for the mounting of the drums of the reducing device R1'. The reducing device R1' comprises two drums 2', 4' rotationally integral mounted between the upright 22.1' and one of the uprights 22.1, driven by a motor 26', in direct drive with the shaft thereof. The motor 26' is equipped with an angular position sensor 26b' which is hidden by one of the uprights 22.1 in FIG. 7.

The reducing device R1' also comprises two sheave wheels 6', 8', two return pulleys, only one of which is visible 16.2', a cable 10' travelling between the driving drums 2', 4' and the sheave wheels 6', 8' and a cable 12' travelling from the yolk of one of the sheave wheels 6' to a return pulley then to a driven wheel 14', and from the driven wheel 14' to the second return pulley 16.2' then to the yolk of the other sheave wheel 8'.

The driven wheel 14' is arranged parallel to the driven wheel 14 and mounted in rotation around the axis X2. The rotations of the two pulleys 14, 14' are independent. For example, the shaft of the driven wheel 14 is hollow and is traversed by the shaft of the driven wheel 14'. The driven wheel 14' may also for example be mounted on bearings turning on the shaft of the pulley 14, itself mounted on bearings turning on the yolk 28. The shaft of the wheels 14 and 14' may further be common and fixed to the yolk 28, the two wheels 14 and 14' being mounted on bearings turning around said axis.

The forearm is provided at its free end with a means of interacting 38 with the external environment, such as a gripper or a tool in the case of a robot, or a handle in the case of a haptic interface.

The rotation movement of the forearm 36 around the axis X3 is transmitted to the pulley 14 and inversely by means of a connecting rod 40 passing through the tube 32 of the arm 30.

The connecting rod 40 is hinged on the driven wheel 14 and on a longitudinal end of the forearm 36 hinged on the arm 30.

The hinging of the connecting rod 40 on the driven wheel 14 is out of axis with respect to the axis X2.

The assembly constituted of the driven wheel 14, the connecting rod 40, the fore arm 36 and the arm 30 thus constitutes a parallelogram structure well known to those skilled in the art.

The yolk 28, arm 30, and forearm 36 assembly is hinged on the chassis 18 around the axis X1, the rotation movement of the assembly is achieved in the example represented by a motor 42 equipped as required with an angular position sensor not represented and by a reducing device having a capstan 44. Any other means of transmission of the forces of the motor 42 to the yolk 28 could obviously be used, such as for example and in a non-exhaustive manner a gearing constituted of a toothed wheel in direct drive with the shaft motor and a toothed wheel fixed on the yolk 28, a gear train, rubbing rollers or instead a belt.

It is understood that a reducing device according to the present invention could also be used to transmit the drive of the motor 42 to the yolk 28 around the axis X1. In this case, a device such as that presented in FIG. 1A is advantageously selected.

In the example represented, the interaction element is advantageously moveable around three axes X4, X5 and X6, and the device thereby obtained offers six degrees of freedom. In this case, it is advantageously possible to equip the rotations around axes X4, X5, X6 by means of angular position sensors, in order to be able to measure the movements of the effector along these 6 degrees of freedom. These 3 rotations could also be equipped with actuating or force feedback motors.

It is also possible to associate two devices of FIG. 7 in parallel, the interaction element 38 being borne by the free ends of the two arm and forearm assemblies, the mobilities around axes X4 and X5 and at least one of the axes X6 being conserved. In this case, a motor in series could be added at the level of the interaction element to offer six degrees of freedom.

It is further possible to associate three devices of FIG. 7 in parallel. In this case, three axes actuated on each of the branches or then only two could be conserved.

The device of FIG. 7 or an assembly composed of two devices of FIG. 7 associated in parallel is particularly suitable as master arm for remote surgery or as haptic interface for a simulator or a surgery training or coaching device, in particular maxillofacial surgery. In fact, such a system requires, in order to use in an optimal manner the haptic interface, that the handle is inclined to fall naturally to hand at the centre of the working space of the robot. This constraint requires in general that the axe(s) X1 of the robot(s) are inclined and not vertical, which is henceforth possible thanks to the invention on account of the arrangement of the counterweights with respect to the axis X1.

It is clearly understood that the drums of the reducing devices R1, R1' of FIGS. 4, 5A to 5D and could be decoupled according to the principle illustrated in FIGS. 9A to 9F and 10 and synchronised with a synchronisation ratio fixed equal to 1 or −1 or different by 1 and −1 or variable and advantageously controlled.

It is also understood that the driving cables 10, 10' and the spiraled drums 2, 4, 2', 4' of the reducing devices R1, R1' of FIGS. 4, 5A to 5D and 7 could be replaced by belts and grooved drums according to the principles illustrated in FIGS. 11A and 11B.

The reducing device according to the present invention has the following advantages:
- it is reversible, which is not the case for example of a reducing device having a gear and worm wheel,
- it offers a high transparency and a good dynamic, since it has little inertia and friction is reduced, which reducing devices having gearings and planetary drives, or the "Harmonic Drive" system do not offer,
- it is simple to implement, unlike planetary drives,
- it enables higher reduction ratios to be obtained than a reducing device having belts,
- it makes it possible to attain higher reduction ratios than a pulley block reducing device, while being of simpler embodiment and than a reducing device having capstans of reduced size,
- its embodiment is simple and implements conventional and robust elements.

The reducing device according to the present invention may be applied to any haptic interface, and to any robot or machine, and in particular to any haptic interface and to any robot or collaborative robot requiring a mechanical transmission with high reduction ratio having a high efficiency.

In a particularly interesting manner, the reducing device according to the invention may be used for the embodiment of a haptic interface for training of surgical procedures.

The invention claimed is:

1. A reducing device with a cable or with a belt and a cable, comprising:
   two driving drums;
   two sheave wheels each mounted in a yolk;
   at least one driving element of a cable or a belt travelling from a first driving drum to one of the sheave wheels, from the one sheave wheel to a second driving drum, from the second driving drum to the sheave wheel, and from the other sheave wheel to the first driving drum;
   a driven cable, one strand of which travels from the yolk of one of the sheave wheels to a driven wheel and one strand travels from the driven wheel to the yolk of the other sheave wheel, the driving drums having different diameters and/or different rotation speeds so that rotation of the driving drums causes a reduction, respectively an increase, in a distance between one of the sheave wheels and the driving drums simultaneously to an increase, respectively reduction, in a distance between the other sheave wheel and the driving drums, driving the driven cable and a rotation movement of the driven wheel.

2. A reducing device according to claim 1, wherein the driving element is a cable and the driving drums comprise a thread to guide the driving cable.

3. A reducing device according to claim 1, wherein the driving element is a cable and the driving drums are rotationally integral and have a same axis of rotation, the drums having different diameters.

4. A reducing device according to claim 3, wherein the threads of the driving drums turn in a same direction.

5. A reducing device according to claim 3, wherein the driving cable is fixed by a first end to a longitudinal end of the first driving drum, is wound around a central part of the second driving drum, and is fixed by a second end to a second longitudinal end of the first driving drum.

6. A reducing device according to claim 1, wherein the driving element is a cable and the driving drums have separate rotation axes, and wherein the reducing device comprises two strands of driving cables, one strand of driving cable travelling between the first driving drum, the first sheave wheel, and the second driving drum, and another strand of driving cable travelling between the first driving drum, the second sheave wheel, and the second driving drum.

7. A reducing device according to claim 1, wherein the driving element is a belt and the driving drums comprise a groove for guiding the belt.

8. A reducing device according to claim 1, wherein the driving element is a belt and the driving drums have separate rotation axes.

9. A reducing device according to claim 6, wherein the driving drums have parallel axes of rotation.

10. A reducing device according to claim 1, wherein the driven cable is guided by return pulleys so as to pass along or near to an axis of rotation around which a yolk supporting the driven wheel can turn.

11. A rotation actuating system comprising:
    at least one electric motor; and
    at least one reducing device according to claim 1, the electric motor being coupled to the driving drums.

12. A rotation actuating system according to claim 11, wherein the driving element is a cable and the driving drums are rotationally integral and have a same axis of rotation, the drums having different diameters, and wherein the motor is in direct drive with the first and second driving drums.

13. A rotation actuating system according to claim 11, wherein the motor is in direct drive or via a transmission with one of the driving drums and the transmission is provided between the first and second driving drums or between the motor and the second driving drum.

14. A rotation actuating system according to claim 11, further comprising a differential between the motor and the driving drums.

15. A rotation actuating system according to claim 13, associated with a controller making it possible to vary and control a synchronisation ratio between the two drums.

16. A rotation actuating system according to claim 11, wherein the at least one motor includes angular position sensors.

17. A hinged mechanism for a robot or haptic interface comprising at least one first actuating system according to claim 11.

18. A hinged mechanism according to claim 17, wherein the driven pulley is mounted moveable in rotation around its axis in a yolk, the yolk being moveable in rotation around another axis not parallel to the axis of rotation of the driven wheel.

19. A hinged mechanism according to claim 17, further comprising an arm fixed on the driven wheel rotationally integral with the driven wheel and a forearm hinged on the arm around a third axis parallel to the axis of rotation of the driven wheel.

20. A hinged mechanism according to the claim 19, further comprising a second actuating system to drive in rotation the arm, the first actuating system driving the forearm around the third axis of rotation.

21. A hinged mechanism according to the claim 20, wherein a driven wheel of the second actuating system is situated near to the driven wheel of the first actuating system and coaxial thereto, a connecting rod being provided between the driven wheel of the first actuating system and the forearm.

22. A robot or haptic interface comprising at least one hinged mechanism according to claim 17 and a motor command system.

23. A robot or haptic interface comprising two hinged mechanisms according to claim 17 in parallel and an actuating motor mounted in series with the two mechanisms.

24. A robot comprising at least one hinged mechanism according to claim 17, wherein the rotation actuating system is associated with a controller making it possible to vary and control a synchronisation ratio between the two drums and wherein, by the controller of the robot, a reduction ratio is modified by reducing it at given moments, and by increasing it at other given moments.

25. A robot according to claim 24, wherein the reduction ratio is modified by reducing it at given moments to be able to move an effector at high speed, during approach phases, and by increasing it at other given moments to be able to apply important forces with the effector during working phases.

26. A haptic interface or master arm comprising at least one hinged mechanism according to claim 17, wherein the rotation actuating system is associated with a controller making it possible to vary and control a synchronisation ratio between the two drums and wherein, by the controller of the robot, a reduction ratio is modified by reducing it at given moments, and by increasing it at other given moments.

27. A haptic interface or master arm according to claim 26, wherein the reduction ratio is modified by reducing it at given moments to be able to increase transparency of the system during movements in free space in a virtual or distant environment, and by increasing it at other given moments to be able to increase a capacity of the system to apply forces in reaction to actions of a user and to interactions in a virtual or distant world during contact tasks.

28. A collaborative robot comprising at least one hinged mechanism according to claim 17, wherein the rotation actuating system is associated with a controller making it possible to vary and control a synchronisation ratio between the two drums and wherein, by the controller of the robot, a reduction ratio is modified by reducing it at given moments, and by increasing it at other given moments.

29. A collaborative robot according to claim 28, wherein the reduction ratio is modified by reducing it at given moments, to be able to increase transparency of the system, during movements in free space, and by increasing it at other given moments, to be able to apply important forces with an effector, during user assistance phases.

30. A reducing device according to claim 2, wherein the driving cable is fixed by a first end to a longitudinal end of the first driving drum, is wound around the central part of the second driving drum and is fixed by a second end to another longitudinal end of the first driving drum.

31. A reducing device according to claim 2, wherein the driving element is a cable and the driving drums have separate rotation axes, and wherein the reducing device comprises two strands of driving cables, one strand of driving cable travelling between the first driving drum, the first sheave wheel and the second driving drum and another strand of driving cable travelling between the first driving drum, the second sheave wheel and the second driving drum.

32. A reducing device according to claim 7, wherein the driving element is a belt and the driving drums have separate rotation axes.

33. A reducing device according to claim 8, wherein the driving drums have parallel axes of rotation.

* * * * *